(12) United States Patent
Yoshida

(10) Patent No.: US 10,333,762 B2
(45) Date of Patent: Jun. 25, 2019

(54) TRANSMITTER, RECEIVER, AND TRANSMISSION METHOD

(71) Applicant: FUJITSU LIMITED, Kawasaki-shi, Kanagawa (JP)

(72) Inventor: Setsuo Yoshida, Inagi (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/891,662

(22) Filed: Feb. 8, 2018

(65) Prior Publication Data

US 2018/0234283 A1    Aug. 16, 2018

(30) Foreign Application Priority Data

Feb. 15, 2017    (JP) .................................. 2017-025678

(51) Int. Cl.
*H04L 27/36*    (2006.01)

(52) U.S. Cl.
CPC .................................... *H04L 27/36* (2013.01)

(58) Field of Classification Search
CPC ....... H04L 27/36; H04L 27/34; H04L 27/362; H04N 5/40
USPC .......................... 375/298, 260, 286; 370/235
See application file for complete search history.

(56) References Cited

U.S. PATENT DOCUMENTS

| 2006/0062319 | A1 | 3/2006 | Kloos | |
| 2015/0092888 | A1* | 4/2015 | Han | H04L 27/2067 375/308 |
| 2018/0063725 | A1* | 3/2018 | Elsherif | H04B 7/0452 |

FOREIGN PATENT DOCUMENTS

| JP | 2008-514159 | 5/2008 |
| JP | 2014-093764 | 5/2014 |

OTHER PUBLICATIONS

Nakazawa et al., "QAM quantum stream cipher using digital coherent optical transmission", The Institute of Electronics, Information and Communication engineers (IEICE), QIT2014-57, Nov. 2014, pp. 55-60 (6 pages), with English Abstract.
Nakazawa et al., "QAM quantum stream cipher using digital coherent optical transmission", Optics Express vol. 22, Feb. 24, 2014, pp. 4098-4107 (10 pages).

* cited by examiner

*Primary Examiner* — Khai Tran
(74) *Attorney, Agent, or Firm* — Fujitsu Patent Center

(57) ABSTRACT

There is provided a transmitter configured to transmit a symbol in a constellation, the symbol corresponding to data to be transmitted, the transmitter including a memory in which key information for generating pseudo random numbers are stored, and a processor coupled to the memory and configured to generate a pseudo random number every the symbol, select data patterns every data areas in which information of types of a data pattern are arranged, based on the pseudo random number, so that a distance between the data patterns to be selected is more than a predetermined value on a plane on which the data areas are continuously arranged every a horizontal axis and a vertical axis of the constellation, and determine the symbol to be transmitted, based on the selected data patterns according to a position of a data pattern corresponding to the data to be transmitted in the constellation.

12 Claims, 24 Drawing Sheets

TRANSMITTER, RECEIVER, AND TRANSMISSION METHOD

CROSS-REFERENCE TO RELATED APPLICATION

This application is based upon and claims the benefit of priority of the prior Japanese Patent Application No. 2017-025678, filed on Feb. 15, 2017, the entire contents of which are incorporated herein by reference.

FIELD

The embodiments discussed herein are related to a transmitter, a receiver, and a transmission method.

BACKGROUND

A transmitting method of large capacity data using a digital coherent transmission technology has been researched and developed. As the digital coherent transmission technology, for example, a multi-level modulation such as quadrature amplitude modulation (QAM), or the like is used.

Further, with respect to this type of transmission technology, an encryption method using the QAM has been proposed (see, e.g., Patent Documents 1 and 2 and Non-Patent Documents 1 and 2).

Related technologies are disclosed in, for example, Japanese Laid-Open Patent Publication No. 2014-093764 (Patent Document 1) and Japanese National Publication of International Patent Application No. 2008-514159 (Patent Document 2).

Related technologies are also disclosed in, for example, Masataka Nakazawa et al., "QAM quantum stream cipher using digital coherent optical transmission," IEICE, QIT 2014-57, November, 2014 (Non-Patent Document 1) and Masataka Nakazawa et al., "QAM quantum stream cipher using digital coherent optical transmission," OPTICS EXPRESS Vol. 22, pp. 4098-4107, Feb. 24, 2014 (Non-Patent Document 2).

SUMMARY

According to an aspect of the invention, a transmitter configured to transmit a symbol in a constellation, the symbol corresponding to data to be transmitted, the transmitter includes a memory in which key information for generating pseudo random numbers are stored, and a processor coupled to the memory and the processor configured to generate a pseudo random number of the pseudo random numbers every the symbol, select data patterns every data areas in which information of types of a data pattern are arranged, based on the pseudo random number, so that a distance between the data patterns to be selected is more than a predetermined value on a plane on which the data areas are continuously arranged every a horizontal axis and a vertical axis of the constellation, and determine the symbol to be transmitted, based on the selected data patterns according to a position of a data pattern corresponding to the data to be transmitted in the constellation.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a diagram illustrating an example of estimation of a pseudo random number by an eavesdropper;

FIG. 6 is a diagram illustrating another example of the estimation of the pseudo random number by the eavesdropper;

DESCRIPTION OF EMBODIMENTS

Generally, an attack by a malicious third party, for example, an attack from an eavesdropper performing a deciphering of a ciphertext includes, for example, a ciphertext only attack and a known plaintext attack. In the case of the ciphertext only attack, the eavesdropper obtains only the ciphertext, but in the case of the known plaintext attack, the eavesdropper not only obtains the ciphertext but also knows a plaintext before encryption.

For this reason, when the eavesdropper successfully performs the known plaintext attack, the eavesdropper may easily decipher the ciphertext other than the obtained ciphertext by calculating a seed for generating a pseudo random number to be used for encryption.

However, in the encryption method of the related art, it may be difficult to defend the known plaintext attack even though it is possible to defend the ciphertext only attack.

For example, embodiments of technology capable of defending the known plaintext attack with respect to an encryption method using QAM for large capacity data transmitted by a digital coherent transmission technology will be described below with reference to the drawings.

Figure 1:
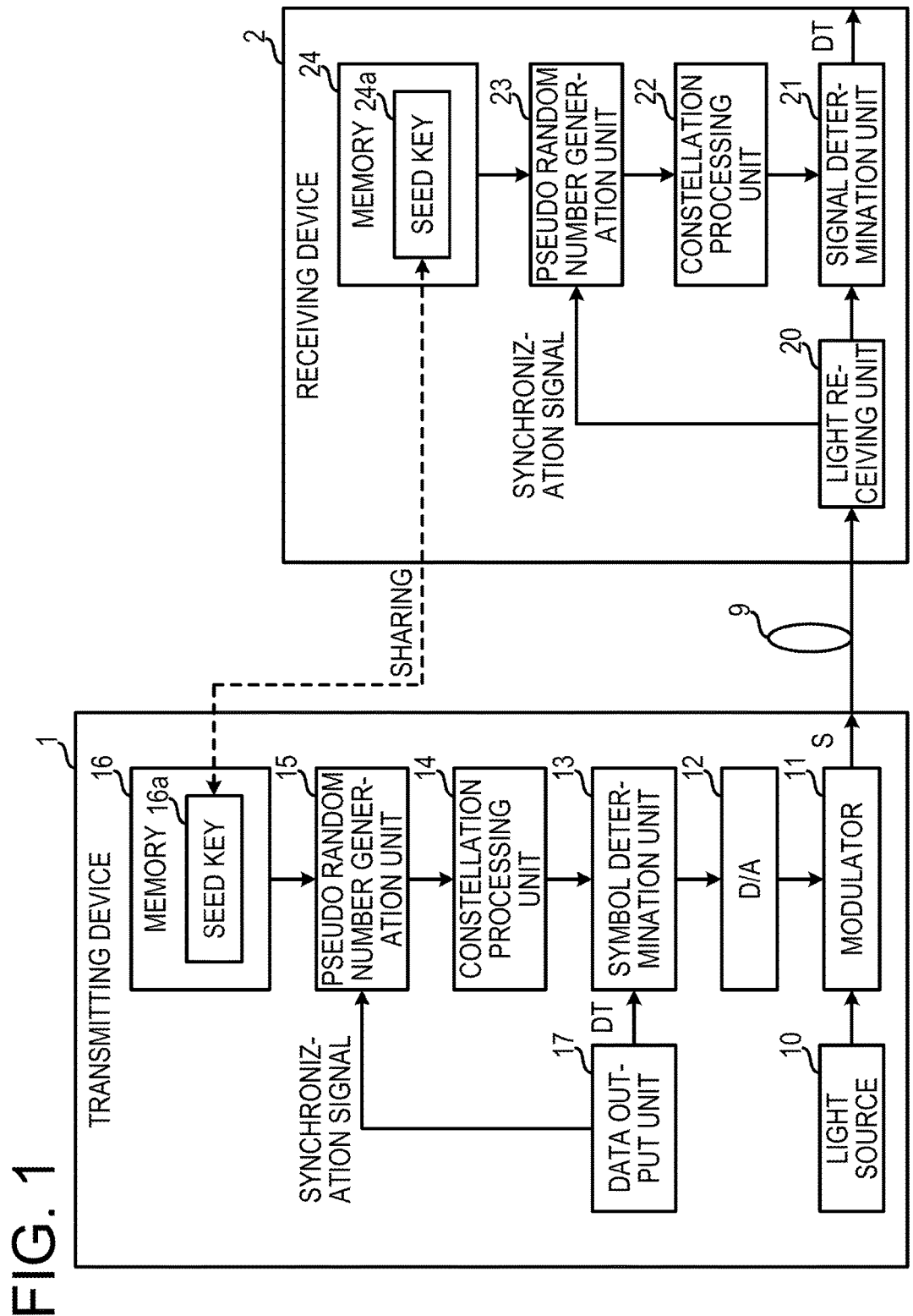
FIG. 1 is a configuration diagram illustrating examples of a transmitting device and a receiving device.

FIG. 1 is a configuration diagram illustrating examples of a transmitting device 1 and a receiving device 2. The transmitting device 1 transmits signal light S to the receiving device 2 via an optical fiber 9 which is a transmission path. The receiving device 2 receives the signal light S from the transmitting device 1 via the optical fiber 9. The signal light S includes data DT that is symbolized using a constellation of QAM.

The transmitting device 1 includes a light source 10, a modulator 11, a digital-to-analog conversion unit (D/A) 12, a symbol determination unit 13, a constellation processing unit 14, a pseudo random number generation unit 15, a memory 16, and a data output unit 17. The digital-to-analog conversion unit 12, the symbol determination unit 13, the constellation processing unit 14, the pseudo random number generation unit 15, and the data output unit 17 are configured by, for example, a processor to actualize a function of hardware such as a field programmable gate array (FPGA), an application specific integrated circuit (ASIC), or the like, or a processor to actualize a function of software.

In the memory 16, a seed key 16a used by the pseudo random number generation unit 15 for generating a pseudo random number is stored. The seed key 16a is a seed of a pseudo random number used for encryption, and is written in the memory 16 in advance.

The pseudo random number generation unit 15 generates the pseudo random number from the seed key 16a in synchronization with a synchronization signal input from the data output unit 17 and outputs the pseudo random number to the constellation processing unit 14. The pseudo random number generation unit 15 switches the pseudo random number for each data DT for one symbol according to the synchronization signal.

The constellation processing unit 14 selects a candidate for a transmission target symbol (hereinafter, referred to as a "transmission symbol") for each data DT for one symbol. In this case, the constellation processing unit 14 uses a plane obtained by continuously arranging data areas in which all types of patterns of the data DT are arranged in respective directions of an I axis and a Q axis of the constellation. The constellation processing unit 14 selects each one type of pattern from separate data areas on the basis of pseudo random numbers so that distances thereamong are equal to or larger than a predetermined value. The constellation processing unit 14 selects the candidate of the transmission symbol according to positions of various selected patterns in the constellation.

The constellation processing unit 14 notifies the candidate of the transmission symbol to the symbol determination unit 13. Specific processing of the constellation processing unit 14 will be described later. Further, the constellation processing unit 14 is an example of a selection unit.

The data output unit 17 outputs the data DT to the symbol determination unit 13. Each time the data output unit 17 outputs the data DT for one symbol, the data output unit 17 outputs the synchronization signal to the pseudo random number generation unit 15.

The symbol determination unit 13 determines the transmission symbol according to the position of the pattern in the constellation, which matches the data DT among the transmission symbol candidates selected by the constellation processing unit 14. Further, the symbol determination unit 13 is an example of a determination unit.

The symbol determination unit 13 outputs a digital signal indicating a phase and an amplitude of light according to the determined transmission symbol to the digital-to-analog conversion unit 12. The digital-to-analog conversion unit 12 converts the digital signal into an analog signal and outputs the analog signal to the modulator 11.

The modulator 11 modulates light input from the light source 10 such as a laser diode or the like into the analog signal input from the digital-to-analog conversion unit 12. In the example, the QAM is described as an example of a modulation method, but the present disclosure is not limited thereto. The modulator 11 modulates the light of the light source 10 to generate the signal light S and outputs the generated signal light S to the receiving device 2.

The receiving device 2 includes a light receiving unit 20, a signal determination unit 21, a constellation processing unit 22, a pseudo random number generation unit 23, and a memory 24. The signal determination unit 21, the constellation processing unit 22, and the pseudo random number generation unit 23 are configured by the hardware such as the FPGA or ASIC, or the function of the software.

The light receiving unit 20 is constituted by, for example, the photodiode or the like, receives the signal light S, converts the signal light S into an electric signal, and outputs the electric signal to the signal determination unit 21. The light receiving unit 20 outputs the synchronization signal to the pseudo random number generation unit 23 each time the light receiving unit 20 outputs the electric signal for one symbol.

In the memory 24, a seed key 24a which the pseudo random number generation unit 23 uses for generating the pseudo random number is stored. The seed key 24a is a seed of a pseudo random number used for encryption, and is written in the memory 24 in advance. The seed key 24a is identical to the seed key 16a in the memory 16 of the transmitting device 1. That is, the transmitting device 1 and the receiving device 2 share the seed keys 16a and 24a.

The pseudo random number generation unit 23 generates the pseudo random number from the seed key 24a in synchronization with the synchronization signal input from the light receiving unit 20 and outputs the pseudo random number to the constellation processing unit 22. The pseudo random number generation unit 23 switches the pseudo random number for each data DT for one symbol according to the synchronization signal. A value of the pseudo random number generated by the pseudo random number generation unit 23 when the receiving device 2 receives the signal light S is equal to the value of the pseudo random number generated by the pseudo random number generation unit 15 when the transmitting device 1 transmits the signal light S. In other words, the values of the pseudo random numbers are synchronized between the pseudo random number generation units 15 and 23 of the transmitting device 1 and the receiving device 2.

Similarly to the constellation processing unit 14 of the transmitting device 1, the constellation processing unit 22 selects the candidate of the transmission symbol for each data DT for one symbol. The constellation processing unit 22 notifies the candidate of the transmission symbol to the signal determination unit 21. Specific processing of the constellation processing unit 22 will be described later. Further, the constellation processing unit 22 is an example of the selection unit.

The signal determination unit 21 detects a range in the constellation where the transmission symbol of the data DT exists from the electric signal input from the light receiving unit 20. The range in the constellation has a magnitude which is not enough to specify each symbol due to an influence of optical noise.

The signal determination unit 21 determines the candidate of the transmission symbol within the range in the constellation among candidates of the transmission symbol as the transmission symbol of the data DT. That is, the signal determination unit 21 specifies the pattern of the data DT corresponding to the transmission symbol from the various patterns of the data DT selected by the constellation processing unit 22 based on the range in the constellation where the transmission symbol of the data DT exists. Further, the signal determination unit 21 is an example of a specifying unit.

The signal determination unit 21 restores the data DT from the pattern of specified data DT and outputs the restored data DT. The constellation of the QAM is described below.

Figure 2:
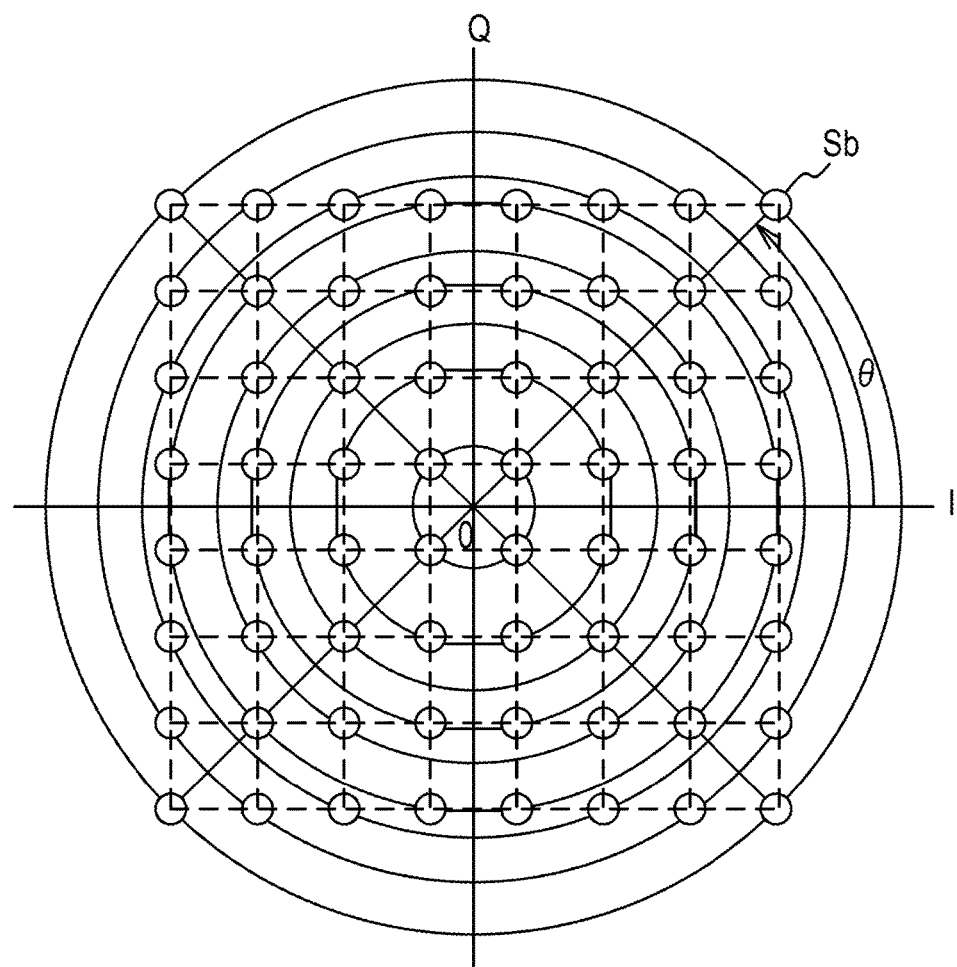
FIG. 2 is a diagram illustrating a constellation diagram of 64 QAM.

FIG. 2 is a diagram illustrating a constellation diagram of 64 QAM. In the constellation diagram, symbols Sb are arranged at equal intervals in the vertical and horizontal directions within the plane constituted by the I axis and the Q axis. The position of each symbol Sb is called a signal point, the amplitude of the light is determined according to the distance between the origin and the signal point (corresponding to a radius of a circle in FIG. 2), and the phase of the light is determined according to an angle θ of the line segment connecting the origin and the signal point with respect to the I axis.

6-bit data having different values are allocated to the respective symbols Sb, and the data are modulated into the signal light of the amplitudes and the phases according to the symbols corresponding to the respective values. Therefore, according to the QAM, the large capacity data may be transmitted.

The transmitting device 1 and the receiving device 2 allocate the pattern of the data DT for one symbol to each symbol in the constellation such that the pattern of data DT for one symbol is not biased in the plane for each type and select four patterns based on the pseudo random number. The transmitting device 1 transmits the symbol corresponding to the pattern that matches the pattern of the data DT for one symbol to be transmitted, among the four patterns. Further, the receiving device 2 specifies the pattern within the range where the data DT in the constellation that may be known from the signal light S exists, among the four patterns. An example thereof will be described below.

First Embodiment

Figure 3:
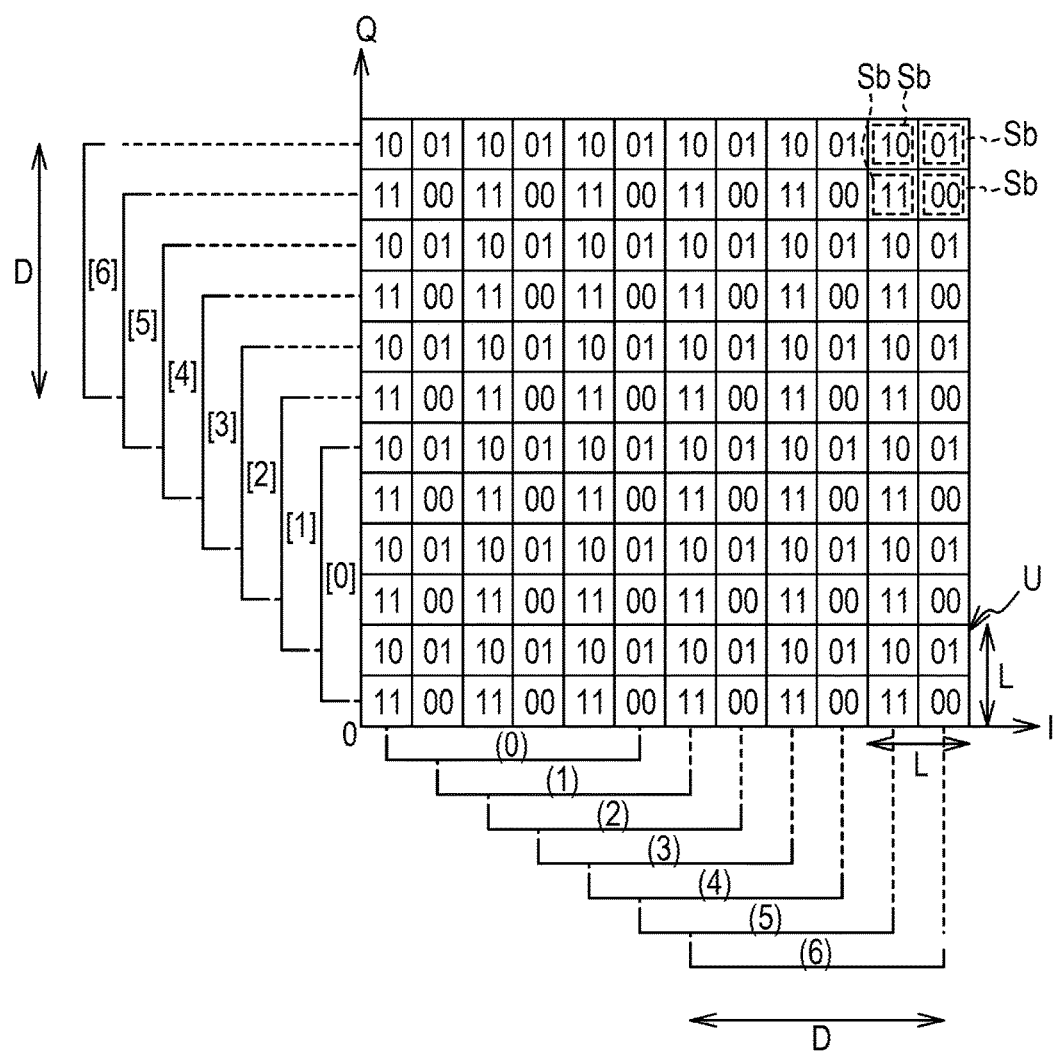
FIG. 3 is a diagram illustrating a constellation according to a first embodiment.

FIG. 3 is a diagram illustrating a constellation according to a first embodiment. The symbol Sb in the constellation is represented by a square checkerboard in which 2-bit numerical values "00," "01," "10," and "11" (binary number) are described. In the example, a 12×12 constellation in which twelve symbols Sb are arranged in each of the directions of the I axis and the Q axis is used. Further, the I axis is an example of a horizontal axis and the Q axis is an example of a vertical axis.

$$P \in \{00, 01, 10, 11\} \quad (1)$$

A pattern P (that is, the plaintext pattern to be encrypted) of the data DT for one symbol includes, for example, 2-bit numerical values "00," "01," "10," and "11" as indicated in Equation (1). Any one type of the pattern P of the data DT is allocated to each symbol Sb. More specifically, 2×2 symbols Sb are arranged in a unit area U in the constellation, and each one type of pattern P of the data DT is allocated to the symbol Sb in the unit area U. Further, the unit region U is an example of a data area.

As described above, in the unit area U, all types of patterns P of the data DT are arranged. A length of one side L of the unit area U is 2 when the length of one side of the checkerboard is 1. The length is an inter-symbol distance (center-to-center distance between the checkerboards) where the light receiving unit 20 of the receiving device 2 and the eavesdropper may not identify the individual symbols Sb due to optical noise. Therefore, the eavesdropper may not identify the pattern P in the unit area U.

The constellation processing units 14 and 22 select the candidate of the transmission symbol using the plane in which the unit area U is continuously arranged in the direction of each of the I axis and the Q axis. 6×6 unit areas U are arranged in the constellation, and the constellation processing units 14 and 22 select each one type of pattern P from the four separate unit areas U based on the pseudo random numbers.

$$R_I \in \{(0), (1), (2), (4), (5), (6)\} \quad (2)$$

$$R_Q \in \{[0], [1], [2], [4], [5], [6]\} \quad (3)$$

Available values of the pseudo random numbers $R_I$ and $R_Q$ are respectively expressed by Equations (2) and (3) as an example. The constellation processing units 14 and 22 obtain the pseudo random numbers $R_I$ and $R_Q$ from the pseudo random number generation units 15 and 23 and determine two coordinates on the I axis and two coordinates on the Q axis based on the pseudo random numbers $R_I$ and $R_Q$, respectively. The pseudo random number $R_I$ is used to determine two coordinates on the I axis, and the pseudo random number $R_Q$ is used to determine two coordinates on the Q axis.

More specifically, the constellation processing units 14 and 22 select line segments (see (0) to (6)) having a length D parallel to the I axis according to the pseudo random number $R_I$ and selects line segments (see [0] to [6]) having the length D parallel to the Q axis according to the pseudo random number $R_Q$. Herein, the length D of each line segment, which is a non-integral multiple of the length L of one side of the unit area U, is equal to or more than a minimum inter-symbol distance in which the light receiving unit 20 of the receiving device 2 may identify the individual symbols Sb in spite of the optical noise. In the example, the length D of each line segment is set to 5 obtained by adding 3 to the length L of one side of the unit area U.

For example, in the case of the pseudo random number $R_I=(1)$, the constellation processing units 14 and 22 select the line segment (1) having the length D parallel to the I axis, and determine 1.5 and 6.5 which are the coordinates of both ends of the line segment (1) as two coordinates on the I axis. Further, for example, in the case of the pseudo random number $R_Q$=[2], the constellation processing units 14 and 22 select the line segment [2] having the length D parallel to the Q axis, and determine 2.5 and 7.5 which are the coordinates of both ends of the line segment [2] as two coordinates on the Q axis.

In addition, the constellation processing units 14 and 22 select each one type of pattern P from the separate unit areas U based on the coordinates of four points in the constellation obtained from a combination of two coordinates on the I axis and two coordinates on the Q axis. More specifically, the constellation processing units 14 and 22 select the candidates of the transmission symbols corresponding to the coordinates of four points in the constellation.

Figure 4:
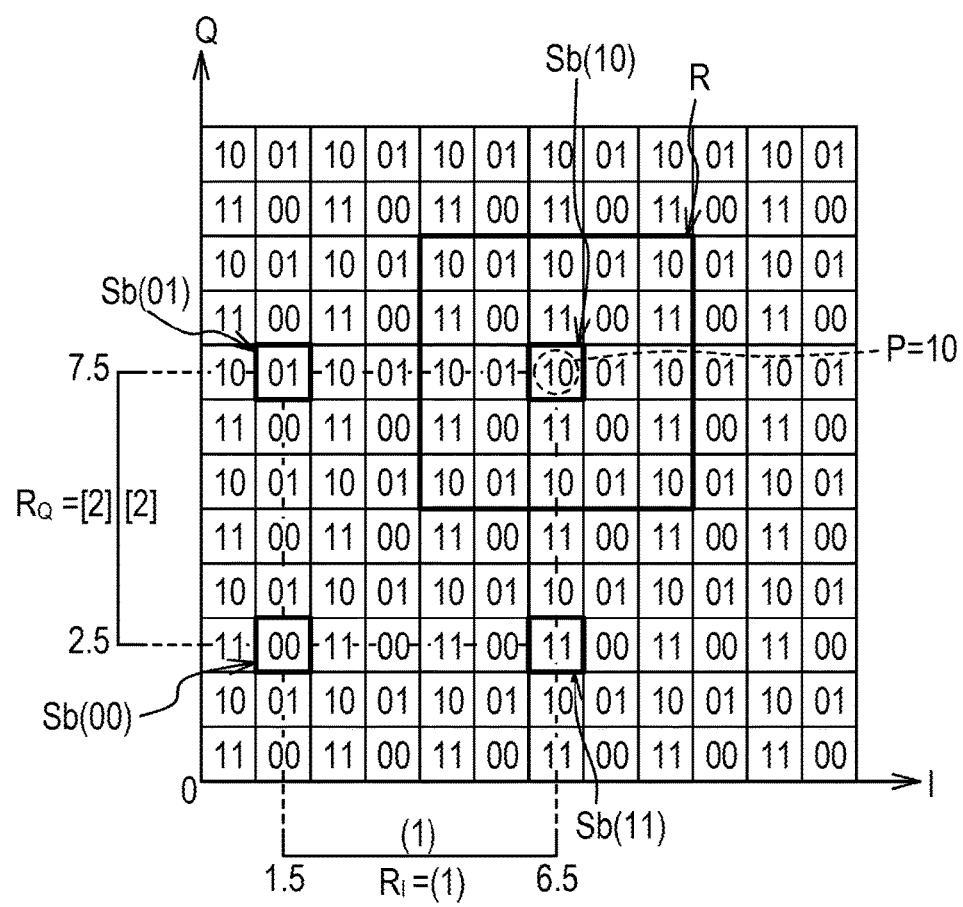
FIG. 4 is a diagram illustrating an example of selection of a candidate of a transmission symbol.

FIG. 4 is a diagram illustrating an example of selection of a candidate of a transmission symbol. In the example, the case of pseudo random number $R_I$=(1) and pseudo random number $R_Q$=[2] is exemplified. The constellation processing units 14 and 22 obtain coordinates (1.5, 2.5), (1.5, 7.5), (6.5, 2.5), and (6.5, 7.5) of four points in the constellation from 1.5 and 6.5 of the I axis coordinates based on the pseudo random number $R_I$=(1) and 2.5 and 7.5 of the Q axis coordinates based on the pseudo random number $R_Q$=[1]. The coordinates of these four points correspond to the intersections of four dotted lines in FIG. 4.

The constellation processing units 14 and 22 select the symbols Sb corresponding to the coordinates of the four points as the candidates of the transmission symbols. Herein, since the length D of the line segment is the non-integer multiple of the length L of one side of the unit area U, the types of patterns P assigned to the symbols Sb corresponding to the coordinates of the four points are different. That is, the constellation processing units 14 and 22 select symbol Sb(00) having the pattern P of "00," symbol Sb (01) in which the pattern P is "01," symbol Sb(10) having the pattern P of "10" and the symbol Sb(11) having the pattern P "11," respectively.

Further, the distance among the selected symbols Sb(00), Sb(01), Sb(10), and Sb(11) is equal to or more than the minimum inter-symbol distance in which the light receiving unit 20 of the receiving device 2 may identify the individual symbols Sb in spite of the optical noise. That is, the constellation processing units 14 and 22 select each one type of pattern P such that the distance between the constellation processing units 14 and 22 is equal to or more than the inter-symbol distance from the separate unit area U based on the pseudo random numbers $R_I$ and $R_Q$. Therefore, the receiving device 2 may specify the type of pattern P of the data DT from the range within the constellation detected from the signal light S including the optical noise.

As described above, the constellation processing units 14 and 22 determine two coordinates on the I axis and two coordinates on the Q axis based on the pseudo random numbers $R_I$ and $R_Q$, respectively. Based on the coordinates of four points in the constellation obtained from the combination of two coordinates on the I axis and two coordinates on the Q axis, the constellation processing units 14 and 22 select each one type of pattern P from the separate unit area U.

Therefore, since the constellation processing units 14 and 22 just move the symbols Sb(00), Sb(01), Sb(10), Sb(0), and Sb(11) depending on four types of patterns P in which the distance between the constellation processing units 14 and 22 is equal to or more than the inter-symbol distance in parallel in the plane, the constellation processing units 14 and 22 may easily select the transmission symbol.

The symbol determination unit 13 determines the transmission symbol Sb according to the position in the constellation of the pattern P matching the data DT among four types of patterns P selected by the constellation processing unit 14. For example, when the pattern P to be transmitted is "10," the symbol determination unit 13 determines the symbol Sb(10) corresponding to the pattern P of "10" from the symbols Sb(00), Sb(01), Sb(10), and Sb(11) as the transmission symbol.

Further, reference numeral R represents a range (hereinafter, referred to as a "symbol existence range") in which the transmission symbol in the constellation which the light receiving unit 20 of the receiving device 2 and the eavesdropper detect from the signal light S may exist. The light receiving unit 20 and the eavesdropper may not identify the individual symbols Sb due to the optical noise in the symbol existence range R. The symbol existence range R is determined by an uncertainty principle and various physical conditions relating to transmission processing.

Since the receiving device 2 knows the pseudo random numbers $R_I$ and $R_Q$ used by the transmitting device 1, the receiving device 2 may specify a correct transmission symbol from the symbol existence range R. In the example, since the pseudo random number $R_I$=(1) and the pseudo random number $R_Q$=[2], the receiving device 2 completes acquiring the positions of the symbols Sb(00), Sb(01), Sb(10), and Sb(11) in the constellation. Therefore, the receiving device 2 may determine that the transmitted pattern P is "10" based on the position of the symbol existence range R in the constellation.

In this case, the distance among the symbols Sb(00), Sb(01), Sb(10), and Sb(11) is equal to or more than the minimum inter-symbol distance in which the light receiving unit 20 of the receiving device 2 may identify the individual symbols Sb in spite of the optical noise. Therefore, two or more symbols among the symbols Sb(00), Sb(01), Sb(10), and Sb(11) are not included in the symbol existence range R.

Therefore, the signal determination unit 21 may specify the pattern P of the data DT corresponding to the transmission symbol based on the symbol existence range R from the symbols Sb(00), Sb(01), Sb(10), and Sb(11) selected by the constellation processing unit 22. That is, the signal determination unit 21 specifies the pattern P of the data DT corresponding to the transmission symbol based on the range in the constellation where the transmission symbol exists from the pattern P selected by the constellation processing unit 22.

Meanwhile, since the eavesdropper does not know the pseudo random numbers $R_I$ and $R_Q$ used by the transmitting device 1 in the case of the ciphertext only attack, the eavesdropper may not specify the pattern P of the data DT corresponding to the transmission symbol based on the symbol existence range R. Therefore, the transmitting device 1 and the receiving device 2 of the example may defend the ciphertext only attack.

Further, since a plurality of patterns P of the same type is included in the symbol existence range R, in the case of the known plaintext attack, the eavesdropper may not specify the pseudo random numbers $R_I$ and $R_Q$ even though the eavesdropper knows that the pattern P to be transmitted is "10" as described below. In addition, it is assumed that the transmitting device 1 includes a high resolution digital-to-analog conversion unit 12 capable of densely arranging the symbols Sb in the constellation (a 12×12 symbol arrangement in the example) such that the plurality of patterns P of the same type is included in the symbol existence range R.

Figure 5:
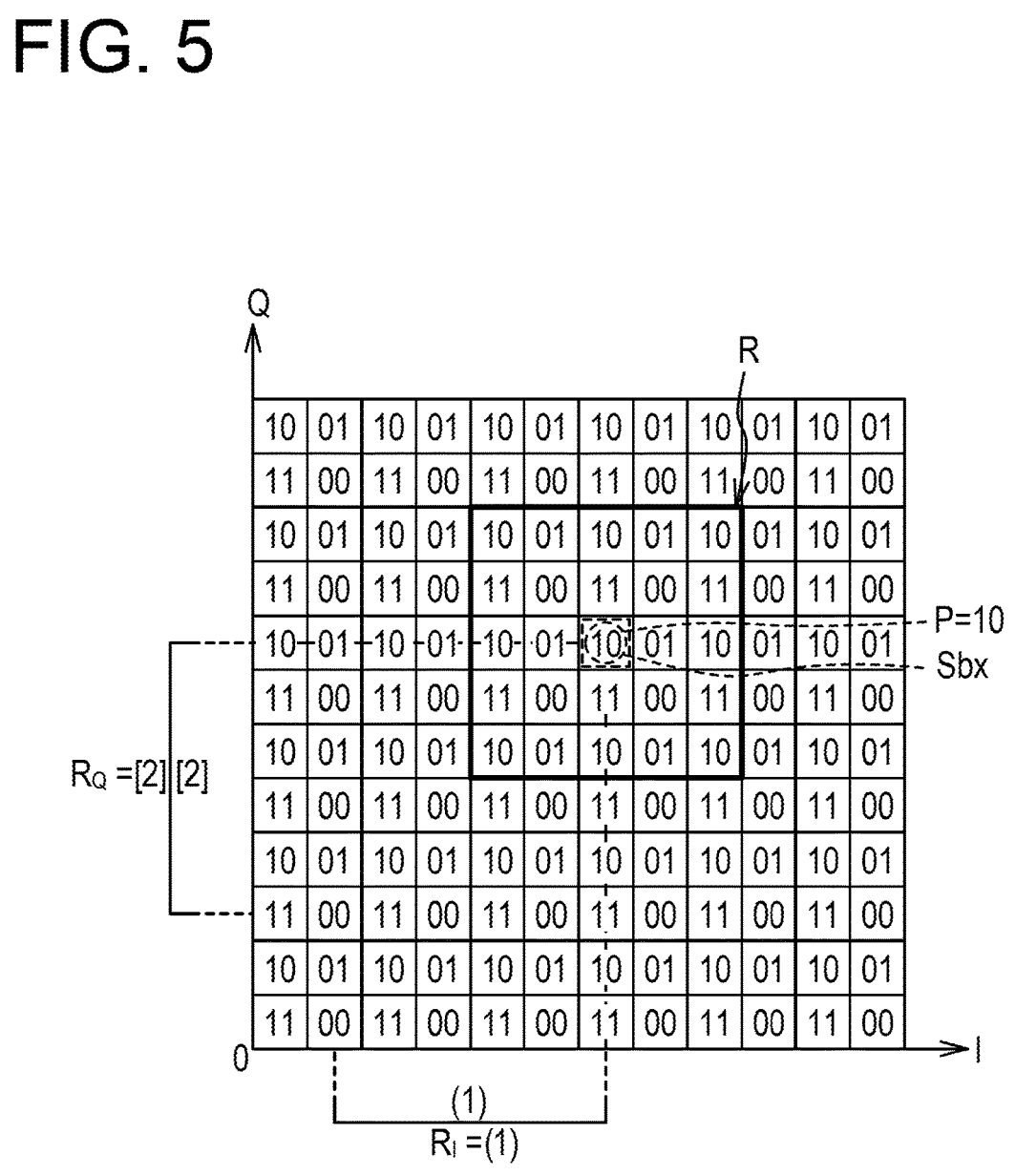
Figure 6:
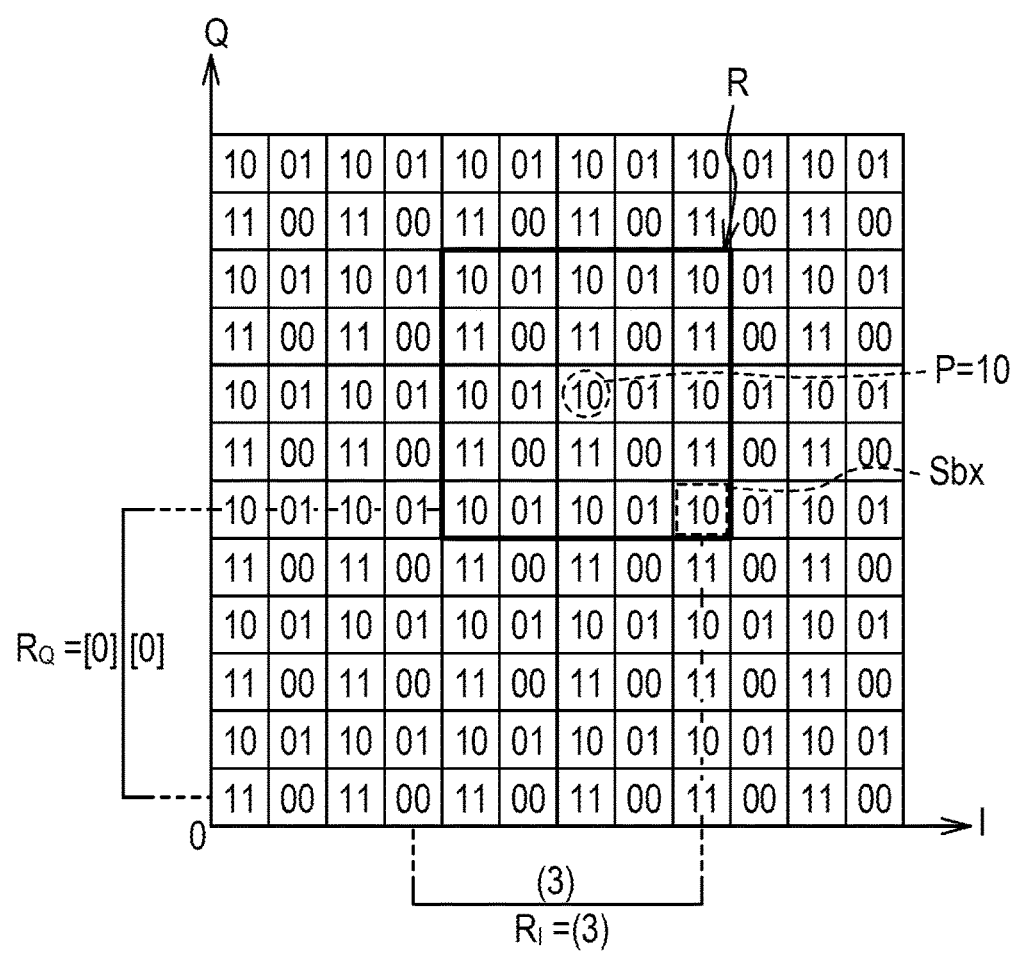
Figure 7:
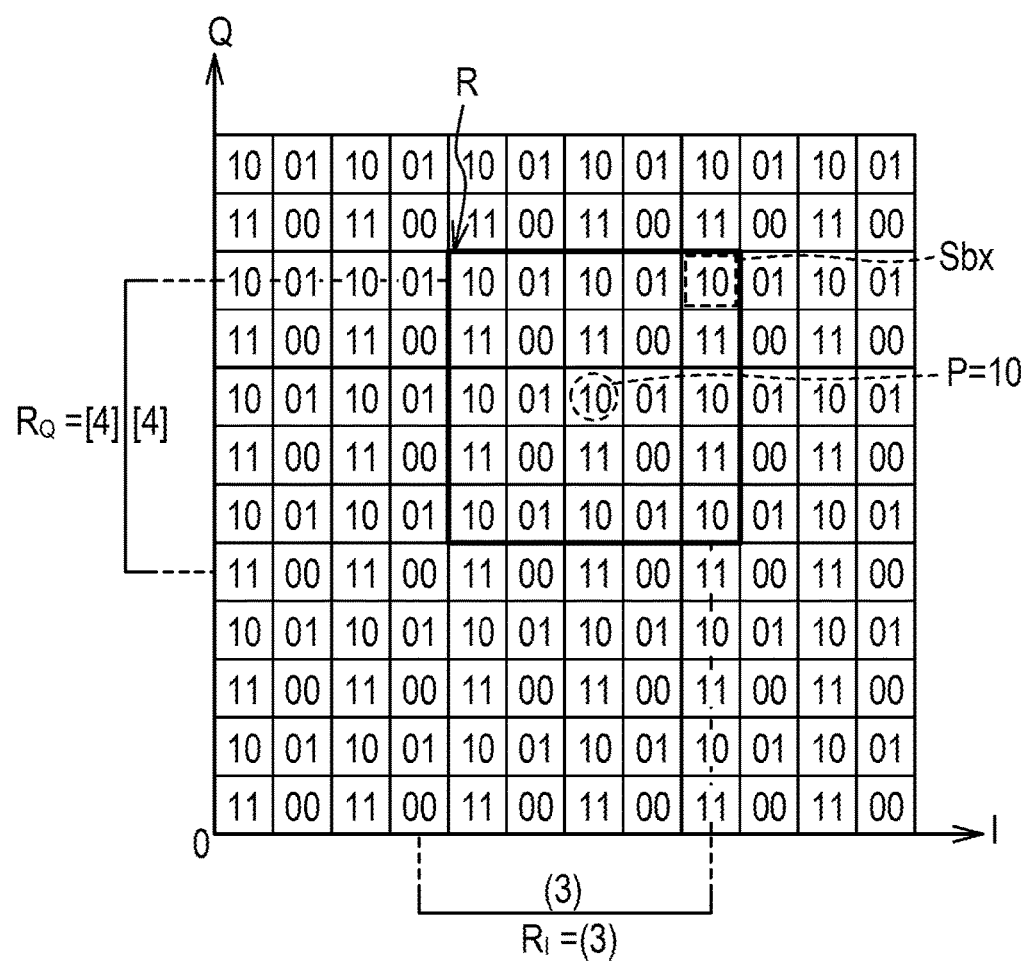
FIG. 7 is a diagram illustrating yet another example of the estimation of the pseudo random number by the eavesdropper.

FIGS. 5 to 7 are diagrams illustrating an example of estimation of pseudo random numbers $R_I$ and $R_Q$ by an eavesdropper. FIG. 5 illustrates a case where the eavesdropper accidentally estimates correct pseudo random numbers $R_I$ and $R_Q$. In this case, the eavesdropper determines that a symbol Sbx at the center of the symbol existence range R is the transmission symbol corresponding to "10" of the known pattern P to estimate as the pseudo random number $R_I$=1) and the pseudo random number $R_Q$=[2].

Further, FIGS. 6 and 7 illustrate a case where the eavesdropper made an incorrect estimation on the pseudo random numbers $R_I$ and $R_Q$. Referring to FIG. 6, the eavesdropper determines the symbol Sbx of one angle of the symbol existence range R as the transmission symbol corresponding to "10" of the known pattern P to estimate that the pseudo random number $R_I$=(3) and the pseudo random number $R_Q$=[0]. Further, referring to FIG. 7, the eavesdropper determines that the symbol Sbx of another angle of the symbol existence range R is the transmission symbol corresponding to "10" of the known pattern P to estimate as the pseudo random number $R_I$=(3) and pseudo random number $R_Q$=[4].

As described above, the eavesdropper may not constantly specify the pseudo random numbers $R_I$ and $R_Q$ from "10" of the known pattern P. In the example, three kinds of estimated patterns are exemplified, but other estimated patterns also exist.

Data lengths of the seed keys 16a and 24a of the pseudo random numbers $R_I$ and $R_Q$ are, for example, approximately 100 bits. For this reason, assuming that the eavesdropper estimates three types of pseudo random numbers $R_I$ and $R_Q$ as described above, when the seed keys 16a and 24a are inversely calculated from a pseudo random number sequence by a Berlekamp-Massey method, at least $3^{100}$ equations need to be solved. However, since a required time is enormous, for example, exceeding the age of the universe, it is impossible to solve the equations in reality.

Therefore, the transmitting device 1 and the receiving device 2 of the example may defend the known plaintext attack.

Second Embodiment

In the first embodiment, the transmitting device 1 has the high-resolution digital-to-analog conversion unit 12 capable of densely arranging the symbol Sb in the constellation, so that the plurality of patterns P of the same type is included in the symbol existence range R, but is not limited thereto. For example, when more complicated encryption processing than the first embodiment is performed, only one pattern P to be transmitted may be allowed to be included in the symbol existence range R and a digital-to-analog conversion unit 12 having a lower resolution than the digital-to-analog conversion unit 12 in the first embodiment may be used.

Figure 8:
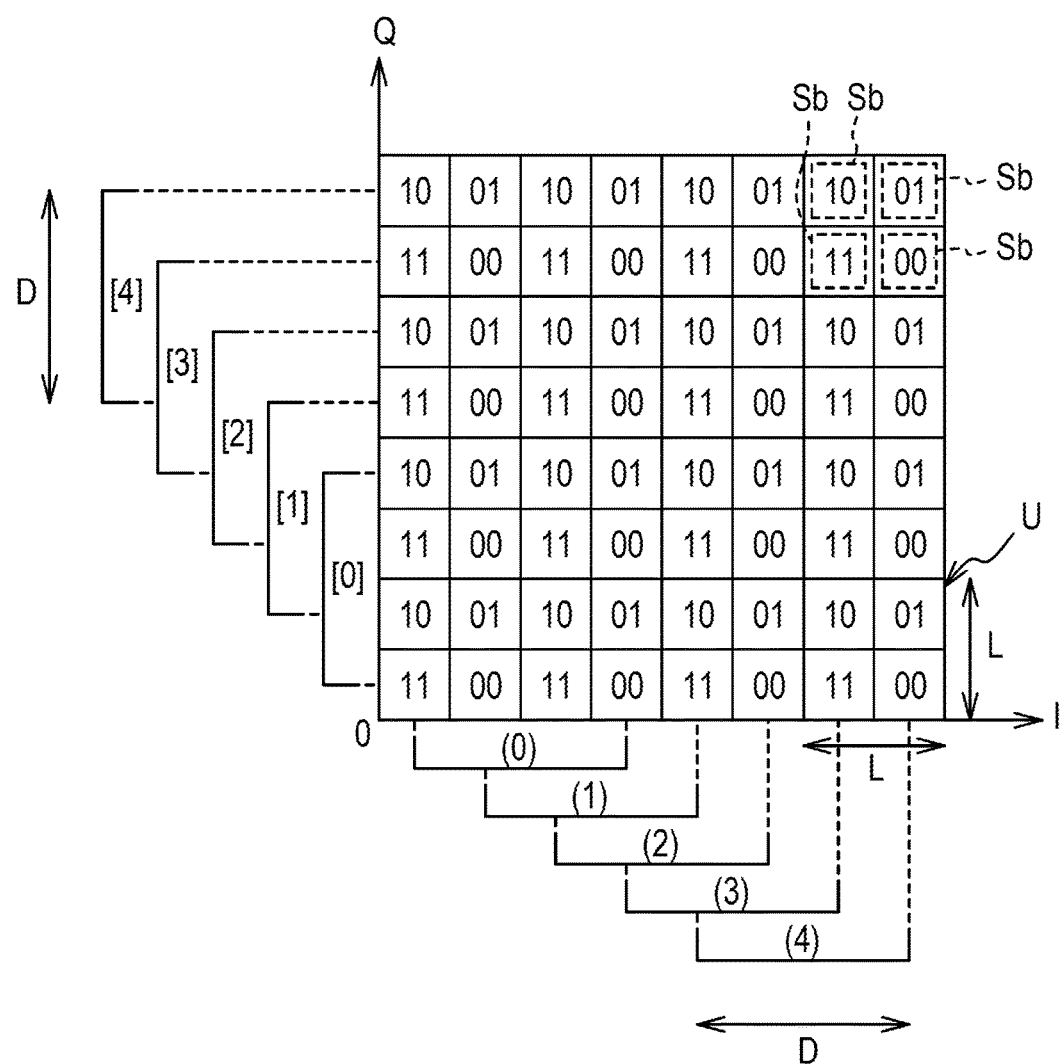
FIG. 8 is a diagram illustrating a constellation according to a second embodiment.

FIG. 8 is a diagram illustrating a constellation according to a second embodiment. In FIG. 8, the same reference numerals are given to the configurations common to those in FIG. 3 and the description thereof will be omitted.

In the example, an 8×8 constellation in which eight symbols Sb are arranged in the directions of the I axis and the Q axis is used. Therefore, in the example, the density of the symbol Sb is lower than that in the first example. Any one type of pattern P of the data DT is allocated to each symbol Sb.

In the unit area U, all types of patterns P of the data DT are arranged. The length of one side L of the unit area U is 2 when the length of one side of the checkerboard is 1. The length is the inter-symbol distance (center-to-center distance between the checkerboards) where the light receiving unit 20 of the receiving device 2 and the eavesdropper may not identify the individual symbols Sb due to the optical noise. Further, the pattern P is defined, for example, by Equation (1).

$$R_I \in \{(0),(1),(2),(4)\} \quad (4)$$

$$R_Q \in \{[0],[1],[2],[4]\} \quad (5)$$

$$R_\theta \in \{-180° \text{ to } +180°\} \quad (6)$$

The values that may be taken by the pseudo random numbers $R_I$ and $R_Q$ are represented by Equations (4) and (5) as an example. As described above, the pseudo random number $R_I$ is used for determining two coordinates on the I axis, and the pseudo random number $R_Q$ is used for determining two coordinates on the Q axis.

In addition, the pseudo random number $R_\theta$ represents the rotational angle around the reference point in the constellation. The constellation processing units 14 and 22 calculate a plurality of rotational coordinates obtained by rotating the plurality of coordinates in the constellation obtained from the pseudo random numbers $R_I$ and $R_Q$, respectively, at the rotational angle indicated by the pseudo random number $R_\theta$.

As described above, the constellation processing units 14 and 22 determine rotational angles, respectively, based on two coordinates on the I axis, two coordinates on the Q axis, and a reference point in the constellation based on the pseudo random numbers $R_I$, $R_Q$, and $R_\theta$.

More specifically, the constellation processing units 14 and 22 select line segments (see (0) to (4)) having a length D parallel to the I axis according to the pseudo random number $R_I$ and select line segments (see [0] to [4]) having the length D parallel to the Q axis according to the pseudo random number $R_Q$. Herein, the length D of each line segment, which is a non-integral multiple of the length L of one side of the unit area U, is equal to or more than a minimum inter-symbol distance at which the light receiving unit 20 of the receiving device 2 may identify the individual symbols Sb in spite of the optical noise. In the example, the length D of each line segment is set to 3 obtained by adding 1 to the length L of one side of the unit area U.

For example, in the case of the pseudo random number $R_I$=(1), the constellation processing units 14 and 22 select the line segment (1) having the length D parallel to the I axis and determine 1.5 and 4.5 which are the coordinates of both ends of the line segment (1) as two coordinates on the I axis. Further, for example, in the case of the pseudo random number $R_Q$=[2], the constellation processing units 14 and 22 select the line segment [2] having the length D parallel to the Q axis and determine 2.5 and 5.5 which are the coordinates of both ends of the line segment [2] as two coordinates on the Q axis.

In addition, the constellation processing units 14 and 22 obtain the coordinates of four points in the constellation from the combination of two coordinates on the I axis and two coordinates on the Q axis.

Figure 9:
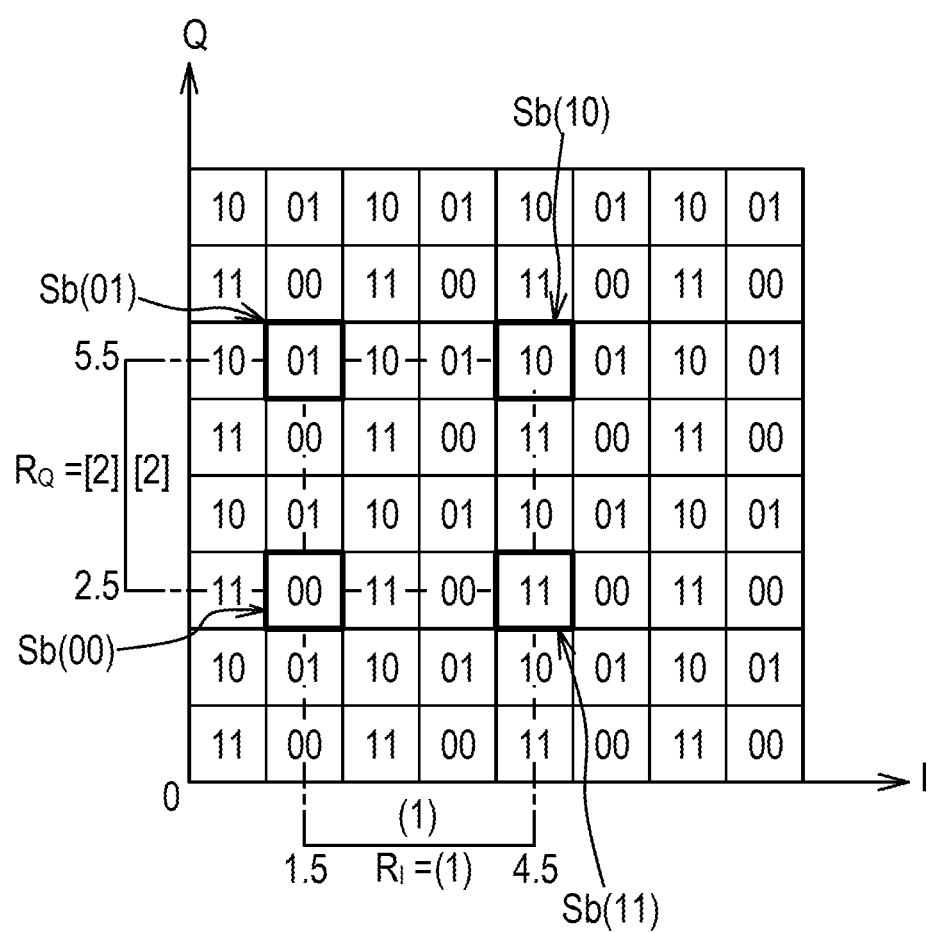
FIG. 9 is a diagram illustrating an example of acquisition of 4 points by the pseudo random number.

FIG. 9 is a diagram illustrating an example of acquisition of four points by the pseudo random numbers $R_I$ and $R_Q$. In the example, the case of the pseudo random number $R_I$=(1) and the pseudo random number $R_Q$=[2] is exemplified. The constellation processing units 14 and 22 obtain coordinates (1.5, 2.5), (1.5, 5.5), (4.5, 2.5), and (4.5, 5.5) of four points in the constellation from 1.5 and 4.5 of the I axis coordinates based on the pseudo random number $R_I$=(1) and 2.5 and 5.5 of the coordinates of the Q axis based on the pseudo random number $R_Q$=[2]. Further, the coordinates of four points correspond to the intersections of four dotted lines in FIG. 9.

Further, the distances among the symbols Sb(00), Sb(01), Sb(10), and Sb(11) corresponding to four points are equal to or more than the inter-symbol distance described above. Therefore, the receiving device 2 may identify the symbols Sb(00), Sb(01), Sb(10), and Sb(11) from the signal light S in spite of the optical noise.

Next, each of the constellation processing units 14 and 22 rotates the acquired four points by the rotational angle indicated by the pseudo random number $R_\theta$ around the reference point.

Figure 10:
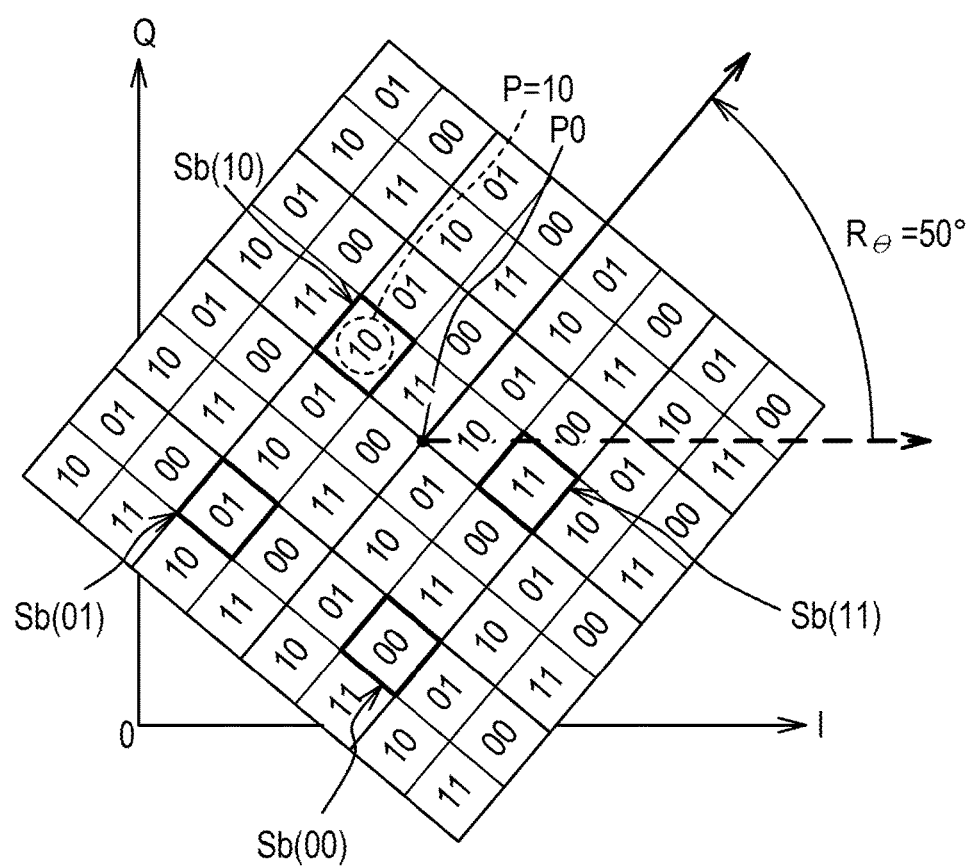
FIG. 10 is a diagram illustrating an example of rotation of 4 points by the pseudo random number.

FIG. 10 is a diagram illustrating an example of rotation of four points by the pseudo random number $R_\theta$. Further, in the example, for example, the pseudo random number $R_\theta$=50°.

The constellation processing units 14 and 22 calculate four rotational coordinates obtained by rotating the coordinates of four points, respectively, at the rotational angle (50°) around the reference point Po. Herein, four rotational coordinates are the coordinates of the symbols Sb(00), Sb(01), Sb(10), and Sb(11) after rotation. In the example, the reference point Po is the center point of all the symbols Sb in the constellation, but is not limited thereto.

The constellation processing units 14 and 22 select each one type of pattern P from the separate unit area U based on the four rotational coordinates. That is, the constellation processing units 14 and 22 select the symbols Sb(00), Sb(01), Sb(10), and Sb(11) after rotation as the candidate of the transmission symbol. As described, the constellation processing units 14 and 22 select each one type of pattern P so that the distance between the constellation processing units 14 and 22 is equal to or more than the inter-symbol distance from separate unit areas U based on the pseudo random numbers $R_I$, $R_Q$, and $R_\theta$.

The symbol determination unit 13 determines the transmission symbol Sb according to the position in the constellation of the pattern P matching the data DT among four types of patterns P selected by the constellation processing unit 14. For example, when the pattern P to be transmitted is "10," the symbol determination unit 13 determines the symbol Sb(10) corresponding to the pattern P of "10" from the symbols Sb(00), Sb(01), Sb(10), and Sb(11) as the transmission symbol.

More specifically, the symbol determination unit 13 determines the symbol Sb at the position of the symbol Sb(10) after rotation among the symbols Sb illustrated in FIG. 2 as the transmission symbol. In this case, since an origin O of the plane in each of FIGS. 2 and 10 is deviated, in the state where the origins O of the planes in FIGS. 2 and 10 match each other, the symbol Sb at the position of the symbol Sb(10) after rotation is determined as the transmission symbol.

As described above, the constellation processing unit 14 determines the rotational angles based on two coordinates on the I axis, two coordinates on the Q axis, and the reference point Po in the constellation, respectively, based on the pseudo random numbers $R_I$, $R_Q$, and $R_\theta$. Further, the constellation processing unit 14 calculates the plurality of rotational coordinates obtained by rotating the coordinates of four points in the constellation obtained from the combination of two coordinates on the I axis and two coordinates on the Q axis around the reference point Po at the rotational angles, respectively. Further, the constellation processing unit 14 selects each one type of pattern P from the separate unit area U based on the plurality of rotational coordinates.

For this reason, the constellation processing unit 14 may perform more complicated encryption processing than the first embodiment in terms of rotating four points in the constellation. Therefore, since the transmitting device 1 is allowed to include only one pattern P to be transmitted in the symbol existence range R, the lower-resolution digital-to-analog conversion unit 12 than the first embodiment may be used.

Figure 11:
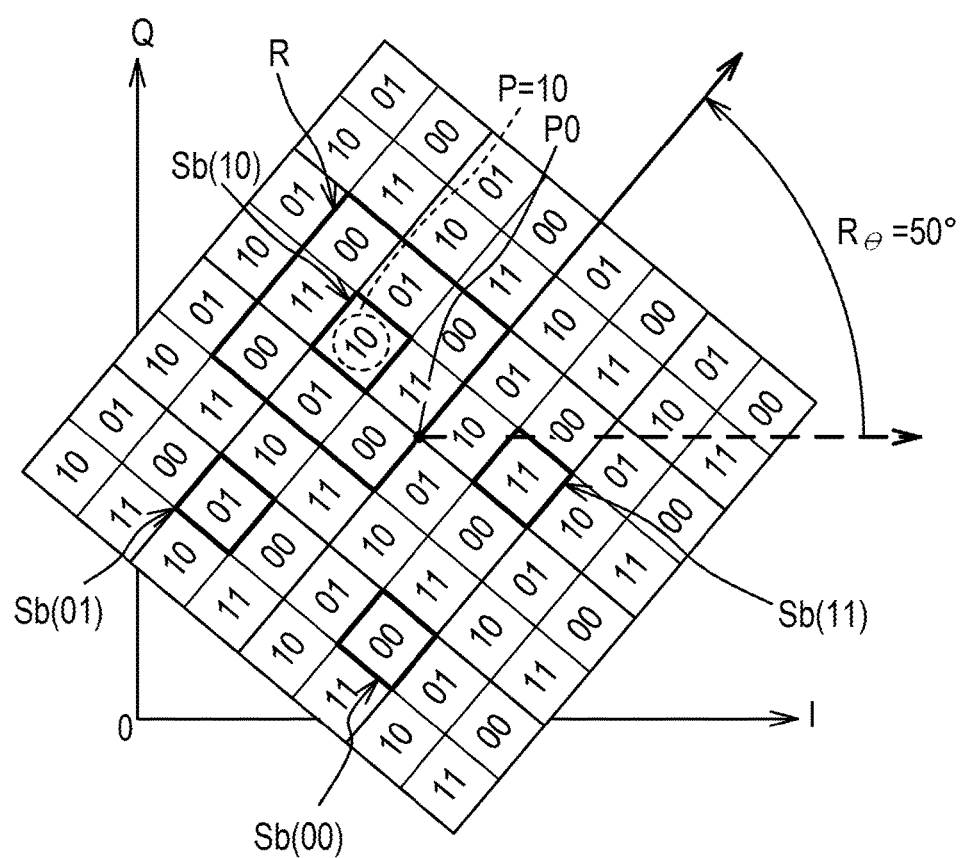
FIG. 11 is a diagram illustrating an example of a symbol existence range in the constellation.

FIG. 11 is a diagram illustrating an example of a symbol existence range R in the constellation. Only one symbol Sb(10) determined as the transmission symbol is included in the symbol existence range R.

Since the receiving device 2 knows the pseudo random numbers $R_I$, $R_Q$, and $R_\theta$ used by the transmitting device 1, the correct transmission symbol may be specified from the symbol existence range R. The receiving device 2 completes acquisition of the positions of the symbols Sb(00), Sb(01), Sb(10), and Sb(11) in the constellation based on the pseudo random number $R_I$=(1), the pseudo random number $R_Q$=[2], and the pseudo random number $R_\theta$=50°.

Therefore, the receiving device 2 may determine that the transmitted pattern P is "10" based on the position of the symbol existence range R in the constellation. In this case, as described above, two or more symbols among the symbols Sb(00), Sb(01), Sb(10), and Sb(11) are not included in the symbol existence range R.

Therefore, the signal determination unit 21 may specify the pattern P of the data DT corresponding to the transmission symbol based on the symbol existence range R from the symbols Sb(00), Sb(01), Sb(10), and Sb(11) selected by the constellation processing unit 22. That is, the signal determination unit 21 specifies the pattern P of the data DT corresponding to the transmission symbol based on the range in the constellation where the transmission symbol exists from the pattern P selected by the constellation processing unit 22.

Meanwhile, since the eavesdropper does not know the pseudo random numbers $R_I$, $R_Q$, and $R_\theta$ used by the transmitting device 1 in the case of the ciphertext only attack, the eavesdropper may not specify the pattern P of the data DT corresponding to the transmission symbol based on the symbol existence range R. Therefore, the transmitting device 1 and the receiving device 2 of the example may defend the ciphertext only attack.

In addition, in the case of the known plaintext attack, the eavesdropper may not specify the pseudo random numbers $R_I$, $R_Q$, and $R_\theta$ even though the eavesdropper knows that the pattern P to be transmitted is "10" as described below.

Figure 12:
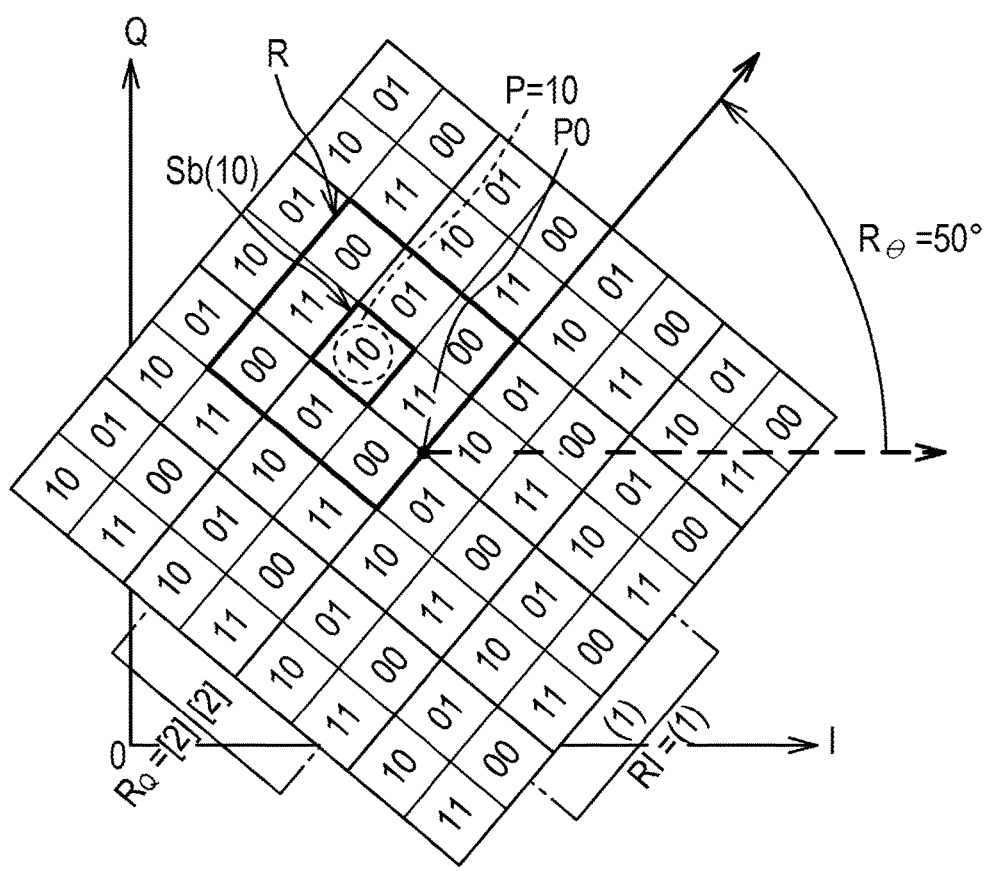
FIG. 12 is a diagram illustrating an example of estimation of a pseudo random number by an eavesdropper.
Figure 13:
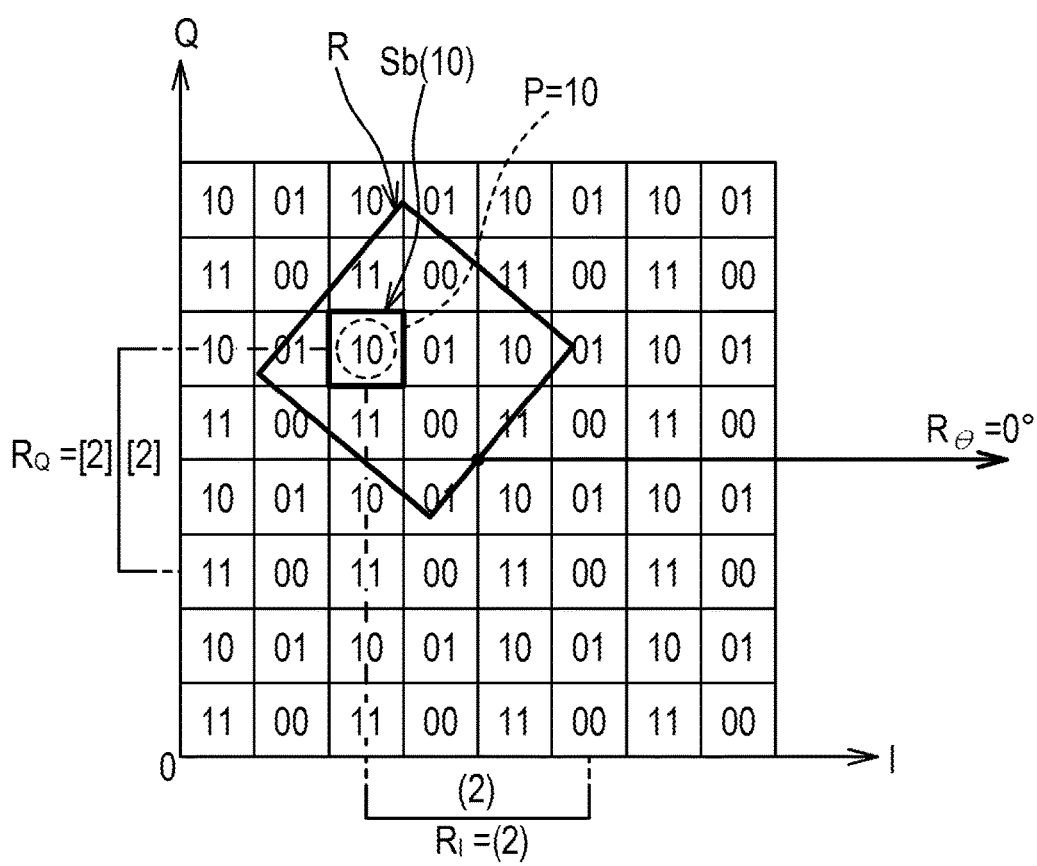
FIG. 13 is a diagram illustrating another example of the estimation of the pseudo random number by the eavesdropper.
Figure 14:
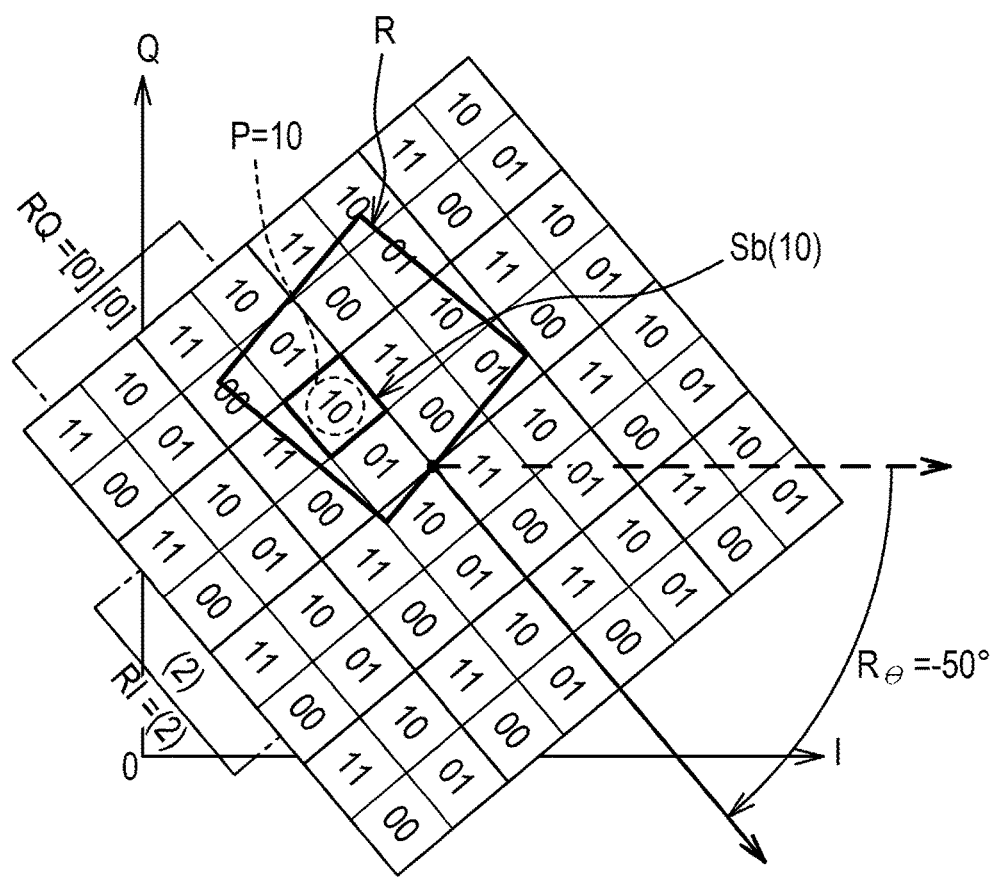
FIG. 14 is a diagram illustrating yet another example of the estimation of the pseudo random number by the eavesdropper.

FIGS. 12 to 14 are diagrams illustrating an example of estimation of pseudo random numbers $R_I$, $R_Q$, and $R_\theta$ by the eavesdropper. FIG. 12 illustrates a case where the eavesdropper accidentally estimates the correct pseudo random numbers $R_I$, $R_Q$, and $R_\theta$. In this case, the eavesdropper assumes the pseudo random number $R_\theta$=50° and presumes the position of the symbol Sb(10) corresponding to "10" of the known pattern P to estimate the pseudo random number $R_I$=(1) and the pseudo random number $R_Q$=[2].

Further, referring to FIG. 13, the eavesdropper assumes the pseudo random number $R_\theta$=0° and presumes the position of the symbol Sb(10) corresponding to "10" of the known pattern P to estimate the pseudo random number $R_I$=(2) and the pseudo random number $R_Q$=[2]. Referring to FIG. 14, the eavesdropper assumes that the pseudo random number $R_\theta$=−50° and presumes the position of the symbol Sb(10) corresponding to "10" of the known pattern P to estimate the pseudo random number $R_I$=(2) and the pseudo random number $R_Q$=[0].

As described above, the eavesdropper may not constantly specify the pseudo random numbers $R_I$, $R_Q$, and $R_\theta$ from "10" of the known pattern P. In the example, three kinds of estimated patterns are exemplified, but other estimated patterns also exist.

The data lengths of the seed keys 16a and 24a of the pseudo random numbers $R_I$, $R_Q$, and $R_\theta$ are, for example, approximately 100 bits. For this reason, assuming that the eavesdropper estimates three types of pseudo random numbers $R_I$, $R_Q$, and $R_\theta$ as described above, when the seed keys 16a and 24a are inversely calculated from a pseudo random number sequence by the Berlekamp-Massey method, at least $3^{100}$ equations need to be solved. However, since a required time is enormous, for example, exceeding the age of the universe, it is impossible to solve the equation in reality.

Therefore, the transmitting device 1 and the receiving device 2 may defend the known plaintext attack.

In the first and second embodiments, the constellation processing units 14 and 22 select each one type of pattern P from four unit areas U, but the present disclosure is not limited thereto.

Figure 15:
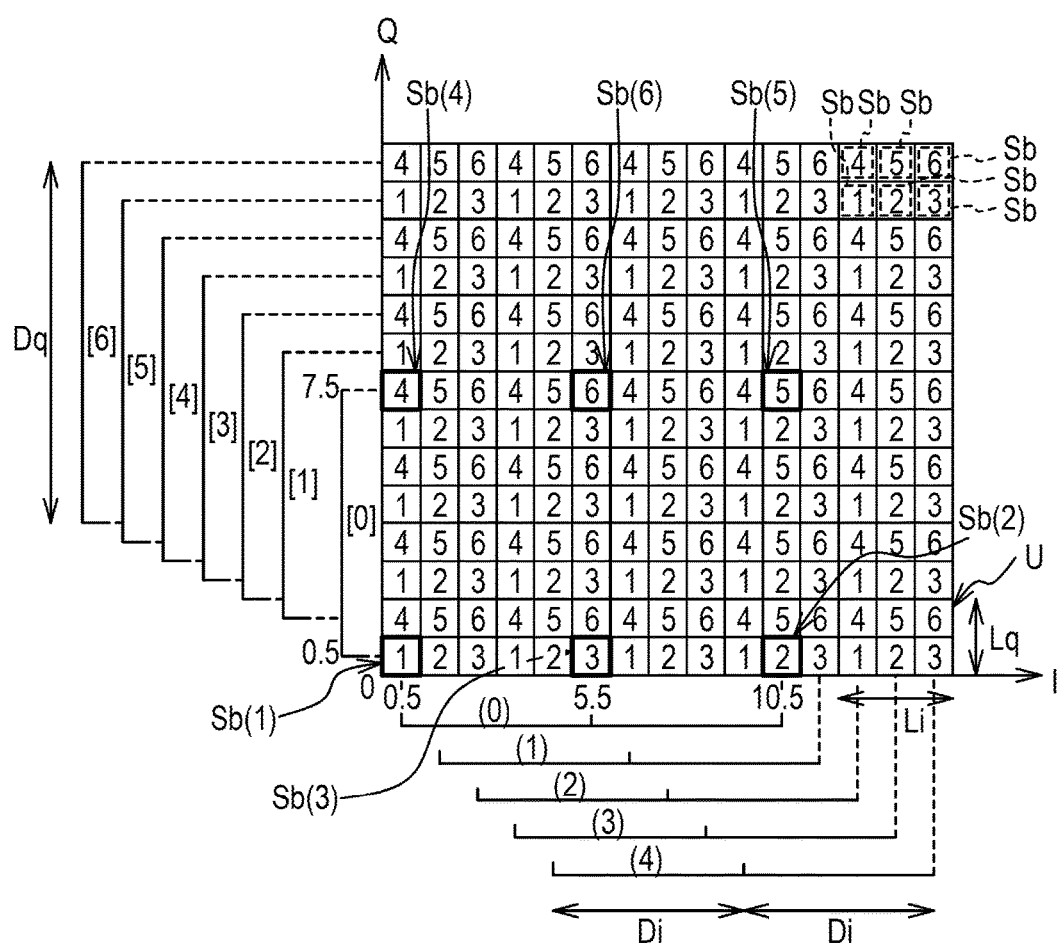
FIG. 15 is a diagram illustrating an example of another constellation.

FIG. 15 is a diagram illustrating an example of another constellation. The symbol Sb in the constellation is represented by the square checkerboard in which numerical values "1" to "6" (decimal number) are described. In the example, a 14×15 constellation in which 15 symbols Sb are arranged in the direction of the I axis and 14 symbols Sb are arranged in the direction of the Q axis is used. Further, the I axis is an example of the horizontal axis and the Q axis is an example of the vertical axis.

$$P \in \{1,2,3,4,5,6\} \quad (7)$$

A pattern P (that is, the plaintext pattern to be encrypted) of the data DT for one symbol includes, for example, the numerical values "1" to "6" as indicated in Equation (7). Any one type of the pattern P of the data DT is allocated to each symbol Sb. More specifically, 2×3 symbols Sb are arranged in a unit area U in the constellation, and one kind of pattern P of the data DT is allocated to the symbol Sb in the unit area U. Further, the unit area U is an example of the data area.

As described above, in the unit area U, all types of patterns P of the data DT are arranged. A length Li of a side in the I-axis direction of the unit area U is 3 when the length of one side of the checkerboard is 1. A length Lq in the Q-axis direction of the unit area U is 2 when the length of one side of the checkerboard is 1. The length is the inter-symbol distance (center-to-center distance between the checkerboards) where the light receiving unit 20 of the receiving device 2 and the eavesdropper may not identify the individual symbols Sb due to the optical noise. Therefore, the eavesdropper may not identify the pattern P in the unit area U.

The constellation processing units 14 and 22 select the candidate of the transmission symbol using the plane in which the unit area U is continuously arranged in the direction of each of the I axis and the Q axis. 7×5 unit areas U are arranged in the constellation and the constellation processing units 14 and 22 select each one pattern P from six separate unit areas U based on the pseudo random number.

$$R_I \in \{(0),(1),(2),(4)\} \quad (8)$$

$$R_Q \in \{[0],[1],[2],[4],[5],[6]\} \quad (9)$$

Available values of the pseudo random numbers $R_I$ and $R_Q$ are expressed by Equations (8) and (9) as an example, respectively. The constellation processing units 14 and 22 obtain the pseudo random numbers $R_I$ and $R_Q$ from the pseudo random number generation units 15 and 23 and determine three coordinates on the I axis and two coordinates on the Q axis based on the pseudo random numbers $R_I$ and $R_Q$, respectively. The pseudo random number $R_I$ is used to determine three coordinates on the I axis and the pseudo random number $R_Q$ is used to determine two coordinates on the Q axis.

For example, in the case of the pseudo random number $R_I=(0)$, the constellation processing units 14 and 22 select the line segment (0) having the length D parallel to the I axis and determine 0.5, 5.5, and 10.5 which are the coordinates of both ends and the center of the line segment (0) as three coordinates on the I axis. Further, for example, in the case of the pseudo random number $R_Q=[0]$, the constellation processing units 14 and 22 select the line segment [0] having the length D parallel to the Q axis and determine 0.5 and 7.5 which are the coordinates of both ends of the line segment [0] as two coordinates on the Q axis.

In addition, the constellation processing units 14 and 22 select each one type of pattern P from the separate unit areas U based on the coordinates of six points in the constellation obtained from a combination of three coordinates on the I axis and two coordinates on the Q axis. More specifically, the constellation processing units 14 and 22 select symbols Sb(1) to Sb(6) corresponding to the coordinates of six points in the constellation.

A length 2×Di of the line segments (0) to (4) in the I-axis direction is the non-integral multiple of the length Li in the I axis direction of the unit area U. A length Dq of the line segments [0] to [6] in the Q-axis direction is the non-integer multiple of the length Lq of the unit area U in the Q-axis direction. Therefore, the types of patterns P assigned to the symbols Sb(1) to Sb(6) corresponding to the coordinates of six points are different.

Further, the distance among the selected symbols Sb(1) to Sb(6) is equal to or more than the minimum inter-symbol distance in which the light receiving unit 20 of the receiving device 2 may identify the individual symbols Sb in spite of the optical noise. That is, the constellation processing units 14 and 22 select each one type of pattern P so that the distance between the constellation processing units 14 and 22 is equal to or more than the inter-symbol distance from the separate unit area U based on the pseudo random numbers $R_I$ and $R_Q$. Therefore, the receiving device 2 may specify the type of the pattern P of the data DT from the range within the constellation detected from the signal light S including the optical noise.

When the same processing as in the first embodiment is performed, the constellation processing units 14 and 22 select the symbols Sb(1) to Sb(6) as the candidate of the transmission symbol. The symbol determination unit 13 determines the symbol Sb corresponding to the pattern P to be transmitted among the symbols Sb(1) to Sb(6) as the transmission symbol. Further, the signal determination unit 21 of the receiving device 2 specifies the pattern P from the position of the symbol existence range R in the constellation.

Further, when the same processing as in the second embodiment is performed, the constellation processing units 14 and 22 rotate the coordinates of the six points in the constellation based on the pseudo random number $R_\theta$ and select the symbols Sb(00), Sb(01), Sb(10), and Sb(11) corresponding to the respective coordinates after rotation as the candidate of the transmission symbol. Therefore, even in the case of the example, the transmitting device 1 and the receiving device 2 may defend not only the ciphertext only attack but also the known plaintext attack.

Third Embodiment

In the first and second embodiments, the constellation processing units 14 and 22 select the plurality of symbols Sb arranged parallel to the I axis and the Q axis as the candidates of the transmission symbols. However, the present disclosure is not limited thereto, and the constellation processing units 14 and 22 may select the plurality of symbols Sb arranged in an oblique direction with respect to the I axis and the Q axis.

Figure 16:
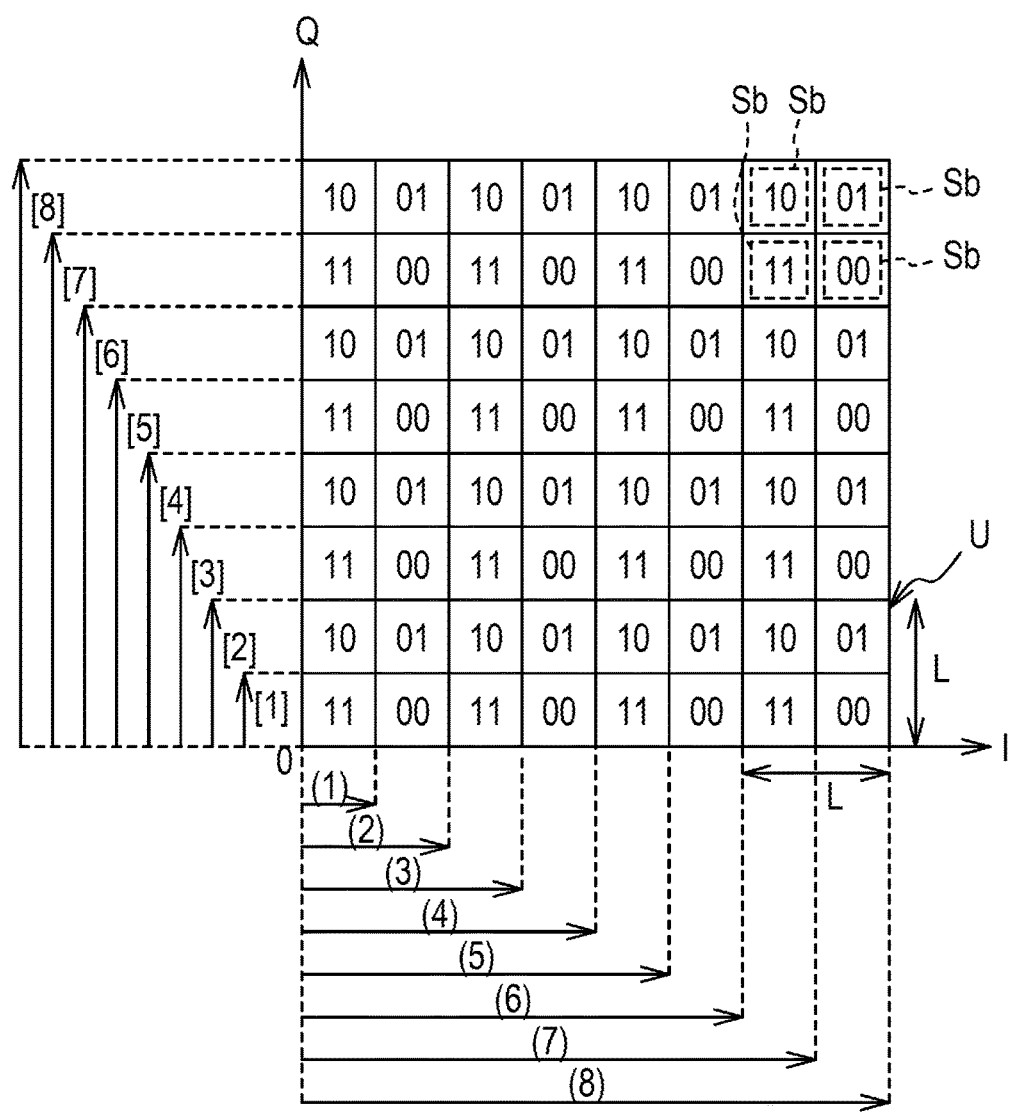
FIG. 16 is a diagram illustrating a constellation according to a third embodiment.

FIG. 16 is a diagram illustrating a constellation according to a third embodiment. The constellation and the unit area U in the example are defined as described with reference to FIG. 8.

$$R_I \in \{(0),(1),(2),(4),(5),(6),(7),(8)\} \quad (10)$$

$$R_Q \in \{[0],[1],[2],[4],[5],[6],[7],[8]\} \quad (11)$$

Based on the pseudo random numbers $R_I$ and $R_Q$ having the values represented by Equations (10) and (11) above, the constellation processing units 14 and 22 select one of line segments (1) to (8) in the I-axis direction and one of line segments [1] to [8] in the Q-axis direction. Fore ends of arrows of line segments (1) to (8) in the I-axis direction represent coordinates 1 to 8 on the I axis, respectively, and the fore ends of the arrows of line segments [1] to [8] in the Q-axis direction represent coordinates 1 to 8 on the Q axis, respectively.

The constellation processing units 14 and 22 determine a reference coordinate in the constellation from the respective coordinates on the I axis and the Q axis, which are represented by the selected I-axis direction line segments (1) to (8) and the Q-axis direction line segments [1] to [8], respectively. That is, the constellation processing units 14 and 22 determine the reference coordinate in the constellation based on the pseudo random numbers $R_I$ and $R_Q$. Further, the reference coordinate is an example of a first coordinate.

Further, the constellation processing units 14 and 22 determine the rotational angle around the reference coordinate based on the pseudo random number $R_\theta$. The constellation processing units 14 and 22 calculate a vector coordinate indicated by a vector after rotation when rotating a vector of a predetermined length extending from the reference coordinate by the rotational angle around the reference coordinate. The vector coordinate is an example of a second coordinate. The processing will be exemplified below.

Figure 17:
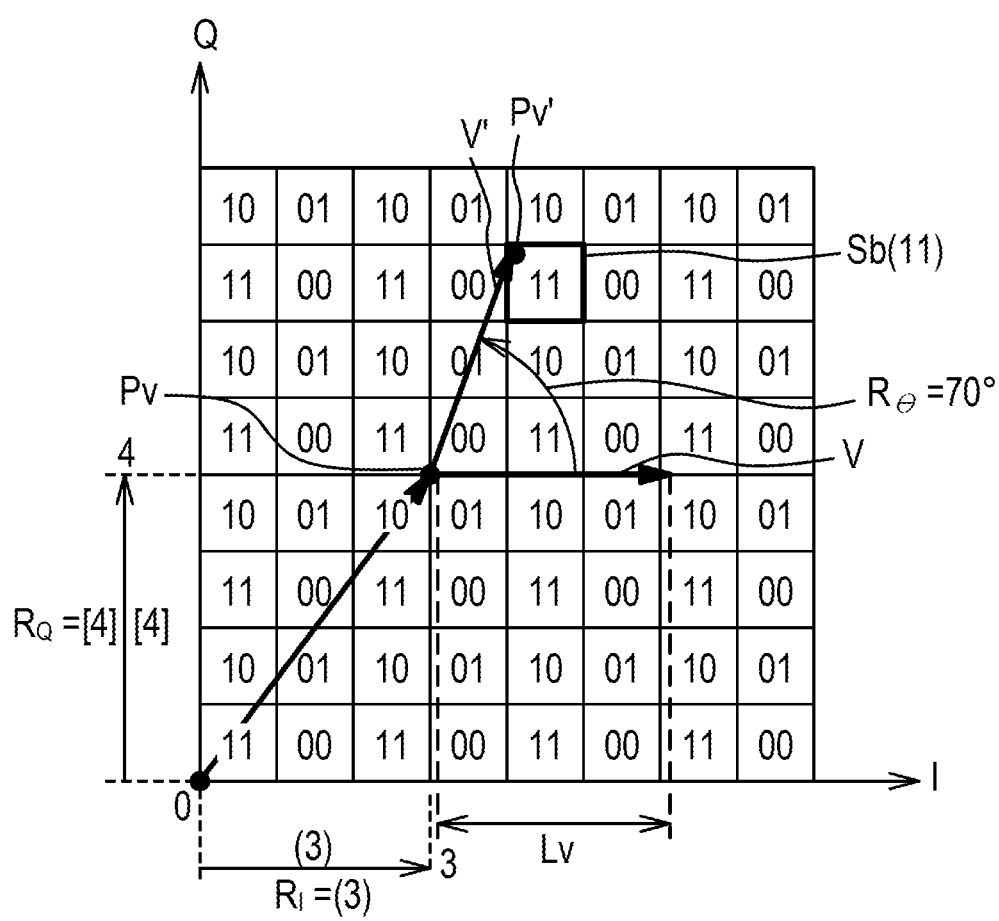
FIG. 17 is a diagram illustrating an example of selection of a reference coordinate and rotation of a vector by the pseudo random number.

FIG. 17 is a diagram illustrating an example of selection of reference coordinates and rotation of vectors by pseudo random numbers. In the example, a case where the pseudo random number $R_I$=(3), the pseudo random number $R_Q$=[4], and the pseudo random number $R_\theta$=70° is exemplified.

The constellation processing units 14 and 22 consider the pseudo random number $R_I$=(3) and the pseudo random number $R_Q$=[4] as position vectors and use a reference coordinate Pv(3, 4) indicated by the position vectors as the reference point. The constellation processing units 14 and 22 rotate a vector V having a predetermined length extending in the I-axis direction from the reference point at the pseudo random number $R_\theta$=70°. As an example, a length Lv of the vector V is set to a value which is $\frac{1}{2}^{1/2}$ times as large as the distance between the candidates of the transmission symbols in the constellation. The distance between the candidates of the transmission symbols in the constellation is equal to or more than the minimum inter-symbol distance at which the light receiving section 20 of the receiving device 2 may identify the individual symbols Sb even when there exists the optical noise. Further, the direction in which the vector V extends is not limited to the I-axis direction and may be, for example, the Q-axis direction.

The constellation processing units 14 and 22 calculate a vector coordinate Pv' indicated by a vector V' after rotation. The constellation processing units 14 and 22 select the symbol Sb(11) in the vector coordinate Pv' as one of the candidates of the transmission symbols. In addition, the constellation processing units 14 and 22 rotate the vector V' at 90° only three times to select the candidates of the remaining transmission symbols.

Figure 18:
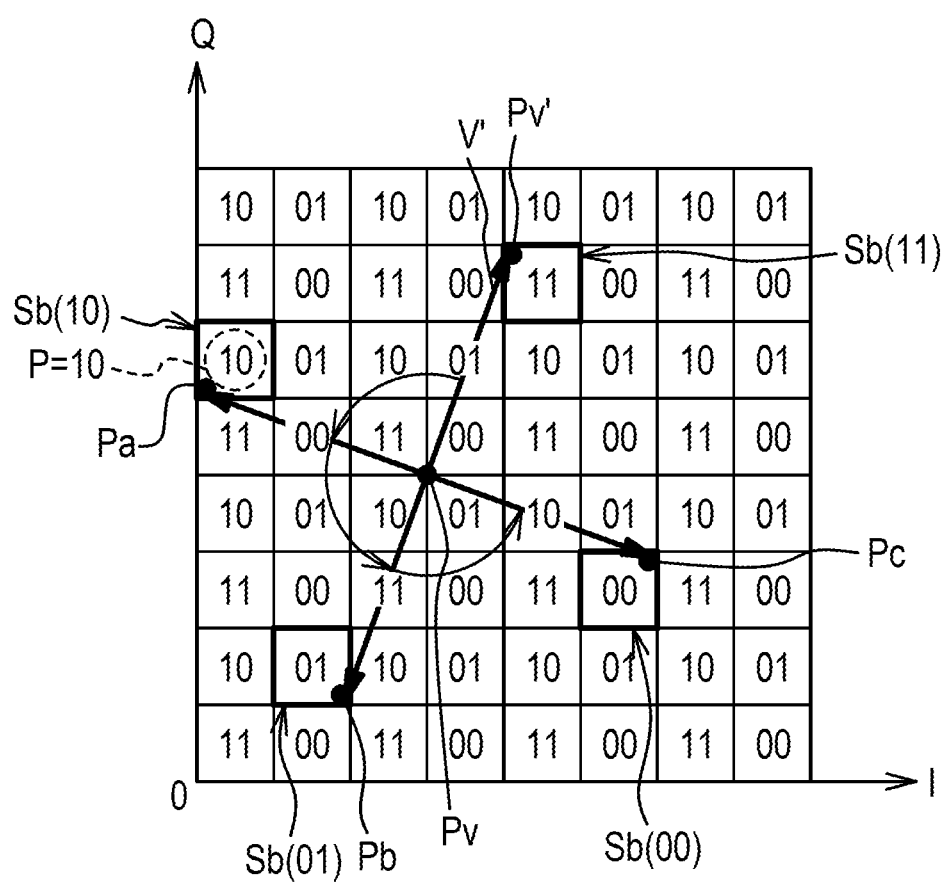
FIG. 18 is a diagram illustrating an example of selection of a candidate of a transmission symbol.

FIG. 18 is a diagram illustrating an example of selection of a candidate of a transmission symbol. When the vector V' is rotated at an angle of 90° around the reference coordinate Pv only three times, the constellation processing units 14 and 22 calculate three rotational coordinates Pa, Pb, and Pc indicated by the vector V' every rotation. The constellation processing units 14 and 22 select the symbols Sb(10), Sb(01), and Sb(00) in the rotational coordinates Pa, Pb, and Pc, respectively, as the candidates of the transmission symbols.

For example, when the pattern P to be transmitted is "10," the symbol determination unit 13 determines the symbol Sb(10) corresponding to the pattern P of "10" from the symbols Sb(00), Sb(01), Sb(10), and Sb(11) as the transmission symbol. That is, the symbol determination unit 13 determines the transmission symbol according to the position of the pattern P in the constellation, which matches the data DT among the symbols Sb(00), Sb(01), Sb(10), and Sb(11).

As described above, the constellation processing units 14 and 22 determine the reference coordinate Pv in the constellation based on the pseudo random numbers $R_I$ and $R_Q$ and determine the rotational angle around the reference coordinate Pv based on the pseudo random number $R_\theta$. When the vector V having a predetermined length, which extends from the reference coordinate Pv is rotated around the reference coordinate Pv at the rotational angle, the constellation processing units 14 and 22 calculate the vector coordinates Pv' indicated by the vector V' after rotation.

Further, when the vector V' is rotated at an angle of 90° around the reference coordinate Pv, the constellation processing units 14 and 22 calculate three rotational coordinates Pa, Pb, and Pc indicated by the vector V' every rotation. The constellation processing units 14 and 22 select each one type of pattern P from the separate unit area U based on the vector coordinate Pv' and the rotational coordinates Pa, Pb, and Pc.

Therefore, unlike the first and second embodiments, the transmitting device 1 and the receiving device 2 may select the plurality of symbols Sb arranged in the oblique direction with respect to the I axis and the Q axis as the candidates of the transmission symbols. For this reason, it is possible to perform more complicated encryption than the first and second embodiments using parallel movement of four points for selecting the candidate of the transmission symbol. For this reason, it becomes more difficult for the eavesdropper to decrypt a cipher.

Figure 19:
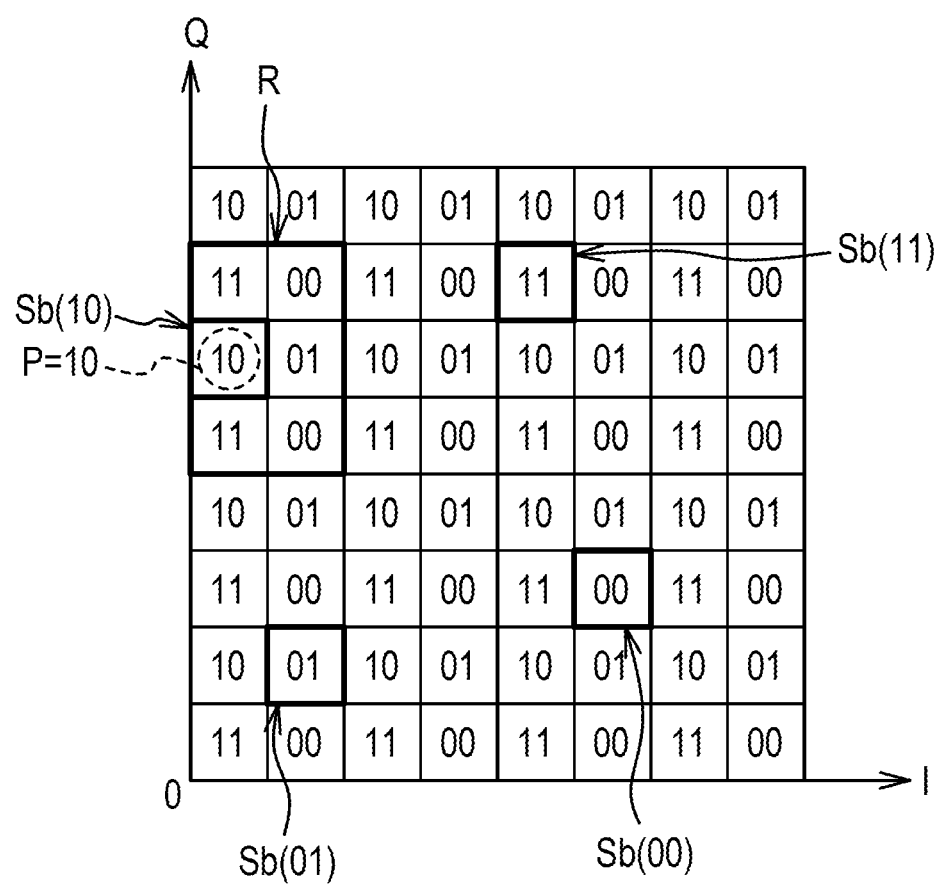
FIG. 19 is a diagram illustrating an example of a symbol existence range in the constellation.

FIG. 19 is a diagram illustrating an example of the symbol existence range R in the constellation. Only one symbol Sb(10) determined as the transmission symbol is included in the symbol existence range R.

Since the receiving device 2 knows the pseudo random numbers $R_I$, $R_Q$, and $R_\theta$ used by the transmitting device 1, the correct transmission symbol may be specified from the symbol existence range R. The receiving device 2 completes acquisition of the positions of the symbols Sb(00), Sb(01), Sb(10), and Sb(11) in the constellation based on the pseudo random number $R_I$=(3), the pseudo random number $R_Q$=[4], and the pseudo random number $R_\theta$=70°.

Therefore, the receiving device 2 may determine that the transmitted pattern P is "10" based on the position of the symbol existence range R in the constellation. In this case, as described above, two or more symbols among the symbols Sb(00), Sb(01), Sb(10), and Sb(11) are not included in the symbol existence range R. Therefore, the signal determination unit 21 may specify the pattern P of the data DT corresponding to the transmission symbol based on the symbol existence range R from the symbols Sb(00), Sb(01), Sb(10), and Sb(11) selected by the constellation processing unit 22.

As a result, the signal determination unit 21 specifies the pattern P of the data DT corresponding to the transmission symbol based on the range in the constellation where the transmission symbol exists from the pattern P selected by the constellation processing unit 22.

Meanwhile, since the eavesdropper does not know the pseudo random numbers $R_I$, $R_Q$, and $R_\theta$ used by the transmitting device 1 in the case of the ciphertext only attack, the eavesdropper may not specify the pattern P of the data DT corresponding to the transmission symbol based on the symbol existence range R. Therefore, the transmitting device 1 and the receiving device 2 of the example may defend the ciphertext only attack.

In addition, similarly to the first and second embodiments, the eavesdropper may not specify the pseudo random numbers $R_I$, $R_Q$, and $R_\theta$ even though the eavesdropper knows that the pattern P to be transmitted is "10." Therefore, the transmitting device 1 and the receiving device 2 may defend the known plaintext attack.

Next, the transmitting method of the transmission device 1 and the receiving method of the receiving device 2 will be described.

Figure 20:
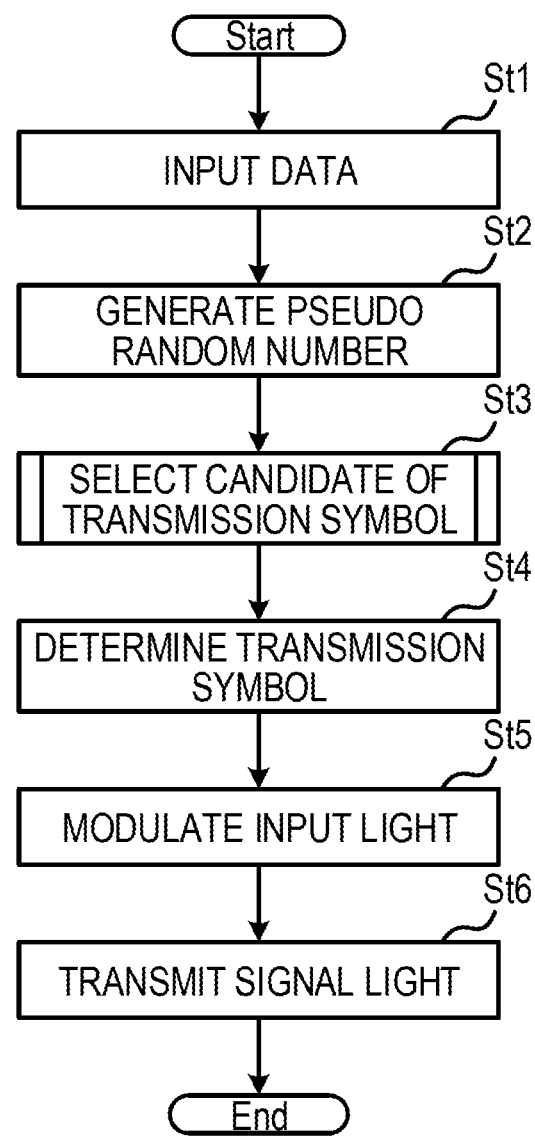
FIG. 20 is a flowchart illustrating an example of transmission processing.

FIG. 20 is a flowchart illustrating an example of transmission processing. In the processing, the transmitting device 1 transmits the symbol Sb in the constellation depending on the data DT.

First, the data DT for one symbol is input in the data output unit 17 (operation St1). Next, the pseudo random number generation unit 15 generates the pseudo random numbers $R_I$, $R_Q$, and $R_\theta$ in synchronization with the synchronization signal from the data output unit 17 (operation St2). Further, in the case of the first embodiment, the pseudo random number $R_\theta$ indicating the rotational angle is not generated.

Next, the constellation processing unit 14 selects the candidate of the transmission symbol by each of the methods described above (operation St3). Further, since selection processing of the candidate of the transmission symbol varies depending on the embodiment, the selection processing will be described later. Next, the signal determination unit 21 determines the transmission symbol depending on the pattern P to be transmitted from the candidate of the transmission symbol (operation St4).

Next, the modulator 11 modulates the light (input light) input from the light source 10 based on the phase and the amplitude of the light according to the transmission symbol (operation St5). Next, the modulator 11 transmits the signal light S obtained by modulating the input light to the receiving device 2 (operation St6). In this way, the transmission processing is executed.

Figure 21:
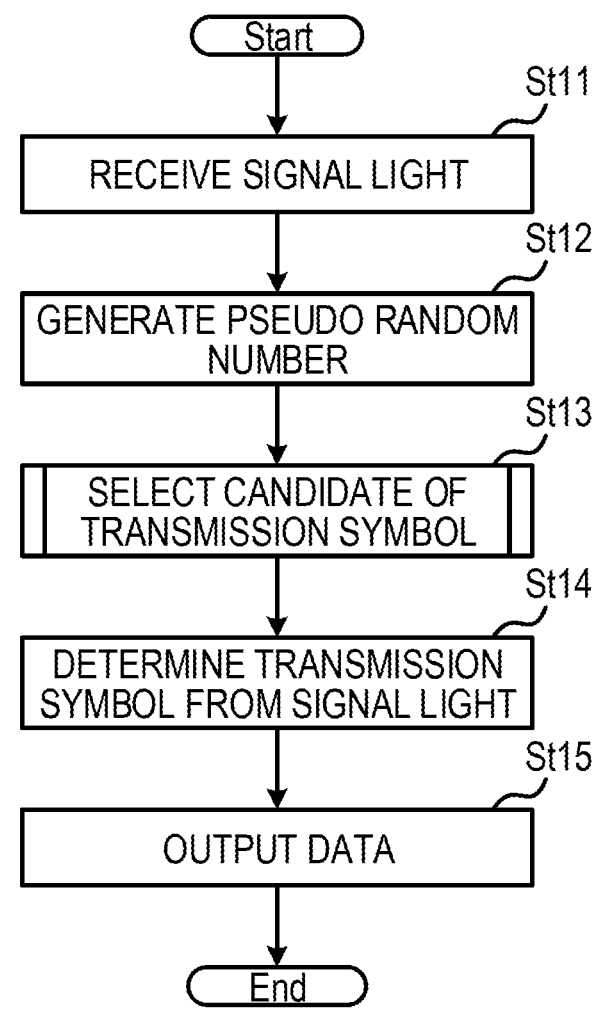
FIG. 21 is a flowchart illustrating an example of reception processing.

FIG. 21 is a flowchart illustrating an example of reception processing. In the processing, the receiving device 2 receives the symbol Sb in the constellation depending on the data DT.

First, the light receiving unit 20 receives the signal light S (operation St11). Next, the pseudo random number generation unit 23 generates the pseudo random numbers $R_I$, $R_Q$, and $R_\theta$ in synchronization with the synchronization signal from the light receiving unit 20 (operation St12). In the case of the first embodiment, the pseudo random number $R_\theta$ indicating the rotational angle is not generated.

Next, the constellation processing unit 22 selects the candidate of the transmission symbol by each of the methods described above (operation St13). Further, since the selection processing of the candidate of the transmission symbol varies depending on the embodiment, the selection processing will be described later. Next, the constellation processing unit 22 detects the symbol existence range R in the constellation from the signal light S and determines the transmission symbol from the candidate of the transmission symbol based on the position of the symbol existence range R (operation St14).

Next, the signal determination unit 21 outputs the data DT of the pattern P depending on the transmission symbol (operation St15). In this way, the reception processing is executed.

Further, in the reception processing, the reception of the signal light S (operation St11) needs not be executed first. Since the pseudo random number of the receiving device 2 is synchronized with the pseudo random number of the transmitting device 1, the receiving device 2 may generate the pseudo random number before the reception of the next signal light S after the completion of the previous reception processing (operation St12), select the candidate of the transmission symbol (operation St13), and receive the signal light S in a state where the receiving device 2 prepares for identifying the selected symbol even though any one symbol of the selected candidate (operation St11). In this case, the processing order is St12, St13, and St11.

Further, after completion of the previous reception processing, the receiving device 2 may generate the pseudo random number before receiving new signal light S (operation St12), then receive the signal light S (operation St11), and select the selected candidate of the transmission symbol (operation St13). In this case, the processing order is St12, St11, and St13.

Next, selection processing of the candidate of the transmission symbol (operations St3 and St13) will be described.

Figure 22:
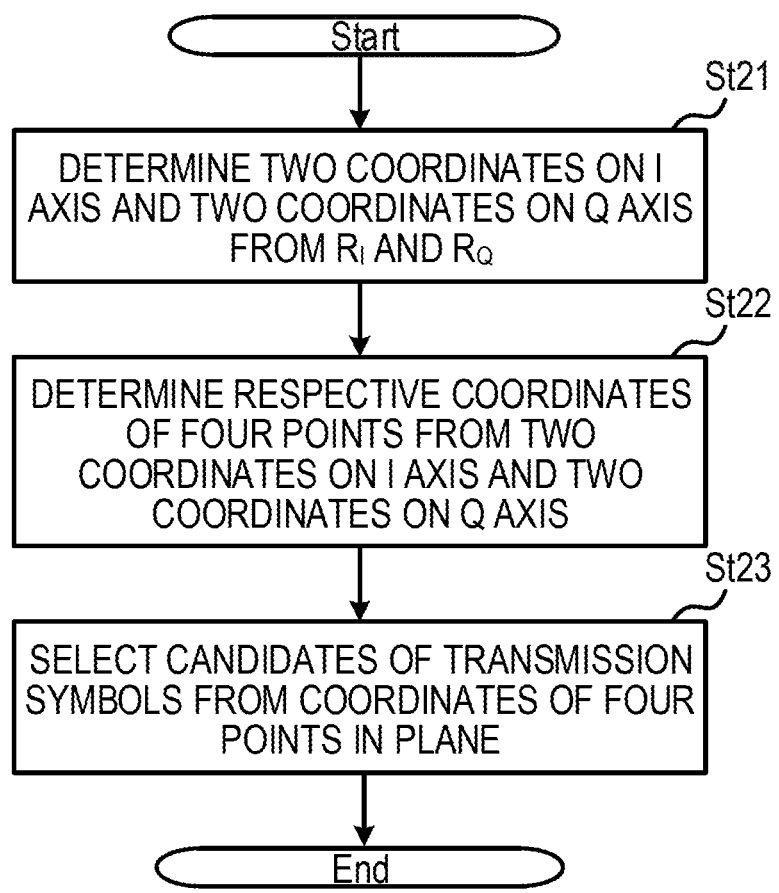
FIG. 22 is a diagram illustrating selection processing of a candidate of a transmission symbol according to the first embodiment.

FIG. 22 is a diagram illustrating selection processing of the candidate of the transmission symbol according to the first embodiment. The processing corresponds to contents described with reference to FIGS. 3 and 4.

The constellation processing units 14 and 22 determine two coordinates on the I axis and two coordinates on the Q axis from the pseudo random numbers $R_I$ and $R_Q$, respectively (operation St21). Next, the constellation processing units 14 and 22 determine coordinates of four points in the constellation from the combination of two coordinates on the I axis and two coordinates on the Q axis (operation St22).

Next, the constellation processing units 14 and 22 select the candidate of the transmission symbol from the coordinates of four points in the constellation (operation St23). In this way, the selection processing of the candidate of the transmission symbol is executed.

Figure 23:
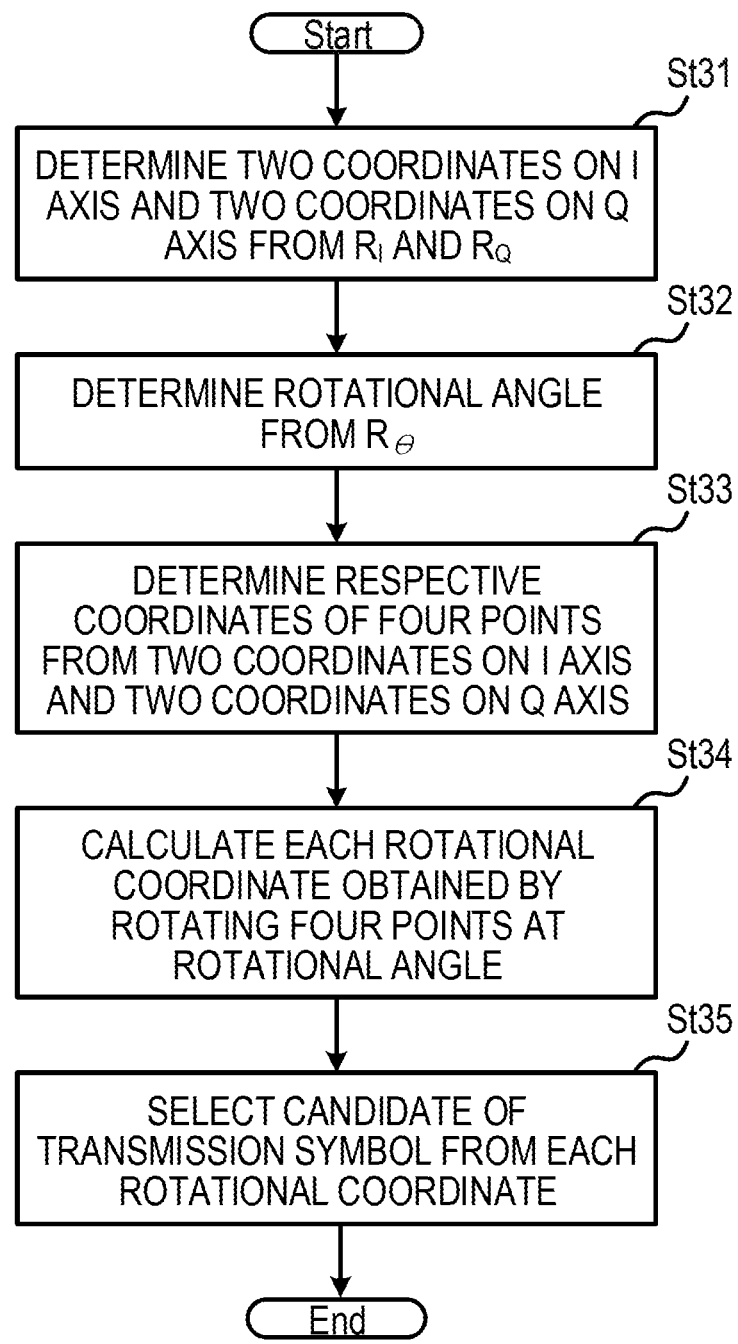
FIG. 23 is a diagram illustrating selection processing of a candidate of a transmission symbol according to a second embodiment.

FIG. 23 is a diagram illustrating the selection processing of the candidate of the transmission symbol according to the second embodiment. The processing corresponds to the contents described with reference to FIGS. 8 to 10.

The constellation processing units 14 and 22 determine two coordinates on the I axis and two coordinates on the Q axis from the pseudo random numbers $R_I$ and $R_Q$, respectively (operation St31). Next, the constellation processing units 14 and 22 determine the rotational angle from the pseudo random number $R_\theta$ (operation St32). Next, the constellation processing units 14 and 22 determine respective coordinates of four points in the constellation from the combination of two coordinates on the I axis and two coordinates on the Q axis (operation St33).

Next, the constellation processing units 14 and 22 calculate four rotational coordinates obtained by rotating four points in the constellation around the reference point Po at the rotational angle (operation St34). Next, the constellation processing units 14 and 22 select the candidate of the transmission symbol from four rotational coordinates (operation St35). In this way, the selection processing of the candidate of the transmission symbol is executed.

Figure 24:
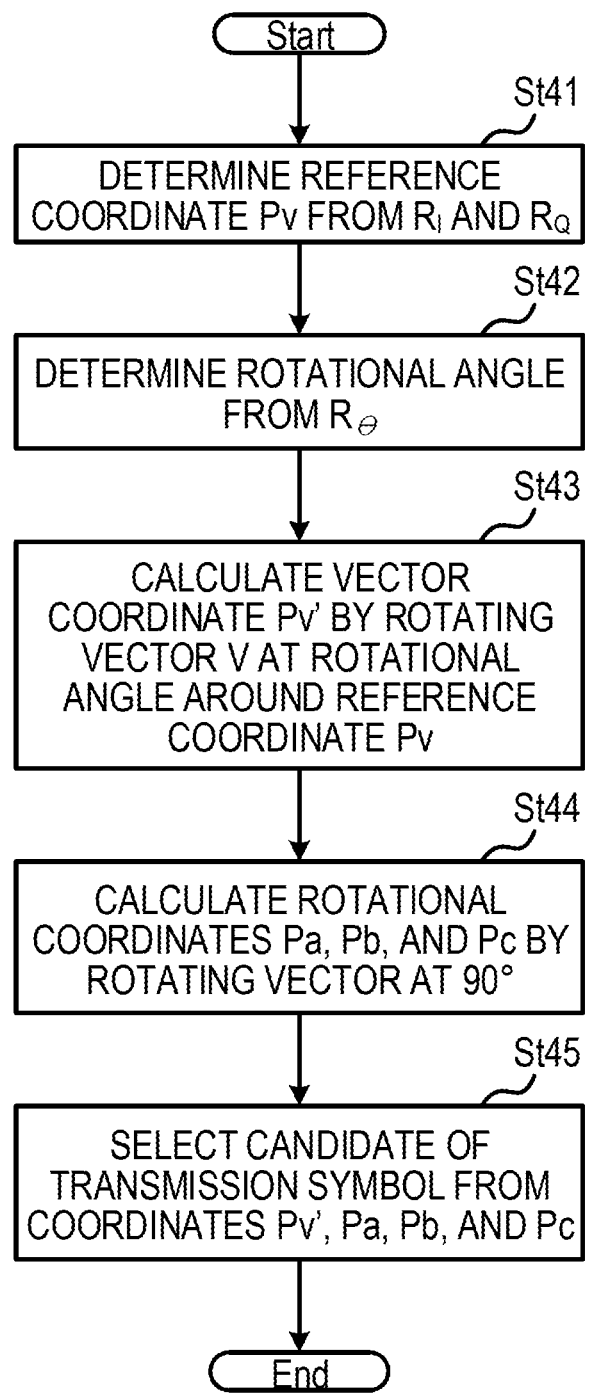
FIG. 24 is a diagram illustrating selection processing of a candidate of a transmission symbol according to a third embodiment.

FIG. 24 is a diagram illustrating the selection processing of the candidate of the transmission symbol according to the third embodiment. The processing corresponds to the contents described with reference to FIGS. 16 to 18.

The constellation processing units 14 and 22 determine the reference coordinate Pv in the constellation from the pseudo random numbers $R_I$ and $R_Q$ (operation St41). Next, the constellation processing units 14 and 22 determine the rotational angle from the pseudo random number $R_\theta$ (operation St42). Next, when the vector V is rotated around the reference coordinate Pv at the rotational angle, the constellation processing units 14 and 22 calculate the vector coordinates Pv' indicated by the vector V' after rotation (operation St43).

Next, when the vector V' is rotated at an angle of 90° around the reference coordinate Pv, the constellation processing units 14 and 22 calculate three rotational coordinates Pa, Pb, and Pc indicated by the vector V' every rotation (operation St44).

Next, the constellation processing units 14 and 22 select the candidate of the transmission symbol based on the vector coordinate Pv' and the rotational coordinates Pa, Pb, and Pc (operation St45). In this way, the selection processing of the candidate of the transmission symbol is executed.

According to the transmitting method and the receiving method, the known plaintext attack may be defended as described in the description of the first to third embodiments.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A transmitter configured to transmit a symbol in a constellation, the symbol corresponding to data to be transmitted, the transmitter comprising:
    a memory in which key information for generating pseudo random numbers are stored; and
    a processor coupled to the memory and configured to:
    generate a pseudo random number for every symbols;
    select data patterns from each of data areas in which all types of data patterns are arranged, based on the pseudo random number, so that a distance between the selected data patterns is more than a predetermined value on a plane on which the data areas are continuously arranged in a direction of each of a horizontal axis and a vertical axis of the constellation; and
    determine the symbol to be transmitted according to a position of a data pattern corresponding to the data to be transmitted in the constellation among the selected data patterns.

2. The transmitter according to claim 1, wherein the processor is further configured to:
    determine a plurality of coordinates on the horizontal axis and a plurality of coordinates on the vertical axis, respectively, based on the pseudo random number, and
    select each one type of the data pattern from separate data areas, based on a plurality of coordinates in the constellation obtained from a combination of the plurality of coordinates on the horizontal axis and the plurality of coordinates on the vertical axis.

3. The transmitter according to claim 2, wherein the processor is further configured to:
    determine the plurality of coordinates on the horizontal axis, the plurality of coordinates on the vertical axis, and a rotational angle around a reference point in the constellation, based on the pseudo random number,
    calculate a plurality of rotational coordinates obtained by rotating each of the plurality of coordinates in the constellation obtained from a combination of the plurality of coordinates on the horizontal axis and the plurality of coordinates on the vertical axis at the rotational angle around the reference point, and
    select each one type of the data pattern from the separate data areas, based on the plurality of rotational coordinates.

4. The transmitter according to claim 1, wherein the processor is further configured to:
    determine a first coordinate in the constellation and a rotation angle around the first coordinate, based on the pseudo random number, when a vector extending from the first coordinate with a predetermined length is first rotated at the rotational angle around the first coordinate,
    calculate a second coordinate indicated by the vector after the first rotation, when the vector after the first rotation is second rotated by a predetermined angle around the first coordinate,
    calculate a plurality of third coordinates indicated by the vector after the second rotation, and
    select each one type of the data pattern from separate data areas, based on the second coordinate and the plurality of third coordinates.

5. A receiver configured to receive a symbol in a constellation, the symbol corresponding to transmitted data, the receiver comprising:
    a memory in which key information for generating pseudo random numbers are stored; and
    a processor coupled to the memory and configured to:
    generate a pseudo random number for every symbols;
    select data patterns from each of data areas in which all types of data patterns are arranged, based on the pseudo random number, so that a distance between the selected data patterns is more than a predetermined value on a plane on which the data areas are continuously arranged in a direction of each of a horizontal axis and a vertical axis of the constellation; and
    specify, from the selected data patterns, a data pattern corresponding to the symbol, based on a range in the constellation where the symbol exists.

6. The receiver according to claim 5, wherein the processor is further configured to:

determine a plurality of coordinates on the horizontal axis and a plurality of coordinates on the vertical axis, respectively, based on the pseudo random number, and select each one type of the data pattern from separate data areas, based on the plurality of coordinates in the constellation obtained from a combination of the plurality of coordinates on the horizontal axis and the plurality of coordinates on the vertical axis.

7. The receiver according to claim 6, wherein the processor is further configured to:

determine the plurality of coordinates on the horizontal axis, the plurality of coordinates on the vertical axis, and a rotational angle around a reference point in the constellation, based on the pseudo random number, calculate a plurality of rotational coordinates obtained by rotating each of the plurality of coordinates in the constellation obtained from a combination of the plurality of coordinates on the horizontal axis and the plurality of coordinates on the vertical axis at the rotational angle around the reference point, and select each one type of the data pattern from the separate data areas, based on the plurality of rotational coordinates.

8. The receiver according to claim 5, wherein the processor is further configured to:

determine a first coordinate in the constellation and a rotation angle around the first coordinate, based on the pseudo random number, when a vector extending from the first coordinate with a predetermined length is first rotated at the rotational angle around the first coordinate, calculate a second coordinate indicated by the vector after the first rotation, when the vector after the first rotation is second rotated by a predetermined angle around the first coordinate, calculate a plurality of third coordinates indicated by the vector after the second rotation, and select each one type of the data pattern from separate data areas, based on the second coordinate and the plurality of third coordinates.

9. A transmission method for a transmitter configured to transmit a symbol in a constellation, the symbol corresponding to data to be transmitted, the transmission method comprising:

generating a pseudo random number for every symbols;

selecting data patterns from each of data areas in which all types of data patterns are arranged, based on the pseudo random number, so that a distance between the selected data patterns is more than a predetermined value on a plane on which the data areas are continuously arranged in a direction of each of a horizontal axis and a vertical axis of the constellation; and determining the symbol to be transmitted according to a position of a data pattern corresponding to the data to be transmitted in the constellation among the selected data patterns, by a processor.

10. The transmission method according to claim 9, further comprising:

determining a plurality of coordinates on the horizontal axis and a plurality of coordinates on the vertical axis, respectively, based on the pseudo random number; and selecting each one type of the data pattern, from separate data areas, based on a plurality of coordinates in the constellation obtained from a combination of the plurality of coordinates on the horizontal axis and the plurality of coordinates on the vertical axis.

11. The transmission method according to claim 10, wherein the plurality of coordinates on the horizontal axis, the plurality of coordinates on the vertical axis, and a rotational angle around a reference point in the constellation are determined, based on the pseudo random number, wherein a plurality of rotational coordinates obtained by rotating each of the plurality of coordinates in the constellation obtained from a combination of the plurality of coordinates on the horizontal axis and the plurality of coordinates on the vertical axis at the rotational angle around the reference point is calculated, and wherein each one type of the data pattern is selected from the separate data areas, based on the plurality of rotational coordinates.

12. The transmission method according to claim 9, wherein a first coordinate in the constellation and a rotation angle around the first coordinate are determined, based on the pseudo random number, wherein, when a vector extending from the first coordinate with a predetermined length is first rotated at the rotational angle around the first coordinate, a second coordinate indicated by the vector after the first rotation is calculated, wherein, when the vector after the first rotation is second rotated by a predetermined angle around the first coordinate, a plurality of third coordinates indicated by the vector after the second rotation are calculated, and each one type of the data pattern is selected from separate data areas, based on the second coordinate and the plurality of third coordinates.

* * * * *